US009873565B2

(12) United States Patent
Itoh et al.

(10) Patent No.: US 9,873,565 B2
(45) Date of Patent: Jan. 23, 2018

(54) MOTORIZED ROLLER

(71) Applicant: ITOH DENKI CO., LTD., Kasai-shi, Hyogo (JP)

(72) Inventors: Kazuo Itoh, Kasai (JP); Tatsuhiko Nakamura, Hyogo (JP)

(73) Assignee: Itoh Denki Co., Ltd. (JP)

( * ) Notice: Subject to any disclaimer, the term of this patent is extended or adjusted under 35 U.S.C. 154(b) by 0 days.

(21) Appl. No.: 15/329,489

(22) PCT Filed: Jul. 30, 2015

(86) PCT No.: PCT/JP2015/071678
§ 371 (c)(1),
(2) Date: May 12, 2017

(87) PCT Pub. No.: WO2016/017766
PCT Pub. Date: Feb. 4, 2016

(65) Prior Publication Data
US 2017/0247194 A1    Aug. 31, 2017

(30) Foreign Application Priority Data

Jul. 30, 2014 (JP) .................. 2014-155349

(51) Int. Cl.
  *B65G 13/06* (2006.01)
  *B65G 23/08* (2006.01)
  (Continued)

(52) U.S. Cl.
  CPC ............. *B65G 23/08* (2013.01); *B65G 13/06* (2013.01); *B65G 39/00* (2013.01); *B65G 45/04* (2013.01)

(58) Field of Classification Search
  CPC ........ B65G 23/08; B65G 39/00; B65G 45/04; B65G 13/06
  See application file for complete search history.

(56) References Cited

U.S. PATENT DOCUMENTS 5,088,596 A * 2/1992 Agnoff ................. B65G 13/073
                                                  198/788
5,664,644 A * 9/1997 Reicks .................... B65G 39/09
                                                  184/15.1
(Continued)

FOREIGN PATENT DOCUMENTS

JP       06-047764 U       6/1994
JP         4967874 B2      7/2012
JP       2012-247010 A    12/2012

OTHER PUBLICATIONS

International Search Report for PCT/JP2015/071678 dated Nov. 2, 2015.
(Continued)

*Primary Examiner* — Mark A Deuble
(74) *Attorney, Agent, or Firm* — Wood, Phillips, Katz, Clark & Mortimer

(57) ABSTRACT

Provided is a motor-incorporating roller capable of preventing a grease supply portion from separating. The motor-incorporating roller has a motor and a reducer in a cylindrical roller body and the reducer is provided with a gear train including a plurality of gears. The motor-incorporating roller has a grease supply portion that supplies grease to the plurality of gears in the reducer and is capable of containing grease therein. Furthermore, the motor-incorporating roller has a power output member that outputs power and a shaft portion that pivotally supports the gears. The grease supply portion is integrated with the power output member through the shaft portion to restrict movement of the shaft portion in an axial direction.

12 Claims, 21 Drawing Sheets

(51) Int. Cl.
*B65G 45/04* (2006.01)
*B65G 39/00* (2006.01)

(56) References Cited

U.S. PATENT DOCUMENTS

| | | | | |
|---|---|---|---|---|
| 5,927,477 | A * | 7/1999 | Meittunen | B65G 13/06 198/788 |
| 6,443,295 | B1 * | 9/2002 | Hill | B65G 23/08 198/788 |
| 2003/0034230 | A1 * | 2/2003 | Cespedes | B65G 13/00 198/789 |

OTHER PUBLICATIONS

International Preliminary Report on Patentability, dated Jan. 31, 2017 in Application No. PCT/JP2015/071678.

* cited by examiner

CROSS-SECTIONAL VIEW ALONG A-A

CROSS-SECTIONAL VIEW ALONG B-B

CROSS-SECTIONAL VIEW ALONG C-C

CROSS-SECTIONAL VIEW ALONG D-D

CROSS-SECTIONAL VIEW ALONG E-E

CROSS-SECTIONAL VIEW ALONG F-F

MOTORIZED ROLLER

TECHNICAL FIELD

The present invention relates to a motor-incorporating roller in which a motor and a reducer is incorporated in a roller body, and the roller body itself rotates on its axis.

BACKGROUND ART

As a main part of a roller conveyer, a belt conveyer, or the like, a motor-incorporating roller has been widely known. Regarding this motor-incorporating roller, a motor and a reducer are incorporated in a roller body, so that installation spaces for the motor and the like are not newly required, which can realize space saving.

The reducer has a structure in which members such as gears, shafts, bearings and the like come into contact with one another to perform relative motions. That is, in the reducer, if lubrication between the members is poor, frictional resistance between the members results in wasteful consumption of power. Thus, in order to reduce the wasteful consumption of the power in the reducer, the lubrication between the members is required to be maintained.

However, since the motor-incorporating roller has one of advantages that it can be rotated independently, a lubrication method of externally feeding a lubricant by an oil pump or the like cannot be employed because the advantage is impaired.

Consequently, as a measure for taking lubrication between the members without impairing the above-described advantage of the motor-incorporating roller, Patent Document 1 is cited. This Patent Document 1 has proposed a structure in which a reducer is provided with a grease containing portion to gradually supply grease to gears and the like of the reducer. According to the structure described in this Patent Document 1, since the grease can be supplied between the members in the reducer in conjunction with the rotation of a motor body on its axis, the lubrication can be maintained.

PRIOR ART DOCUMENT

Patent Document

Patent Document 1: JP 4967874 B

DISCLOSURE OF INVENTION

Technical Problem

The motor-incorporating roller according to Patent Document 1 has a structure including the grease containing portion in an interlocking gear.

Generally, in the interlocking gear, since load is intensively applied to a sun gear and the like during rotation, for the sun gear and a plate-like member making up the interlocking gear, a high-rigidity material such as metal and the like is used. Thus, in view of machining, they cannot help being formed as separate bodies from a grease containing portion, and in fact, in the reducer described in Patent Document 1 as well, the grease containing portion is formed as a separate body from a plate-like member to be bonded with the plate-like member. However, bonding the grease containing portion and the plate-like member every manufacturing is not preferable from a point of view of costs and time.

Moreover, in order to address use over a long time, the plate-like member and the grease containing portion need to be bonded inseparably. That is, the grease containing portion cannot be detached from the plate-like member. Thus, for introducing grease to the grease containing portion, the grease is required to be introduced in a state where the grease containing portion is fixed to the plate-like member.

Consequently, the present inventor has considered an installation position of the grease containing portion by applying a structure of Patent Document 1, and has paid attention to an arm member configured to support a shaft member pivotally supporting a planetary gear. That is, the present inventor has produced, as trial, a reducer 500 with an arm portion and a grease containing portion integrated with each other.

As shown in FIG. 26, the reducer 500 produced as trial employs an arm member 501 in which a plate-like support member 502 and a box-like grease containing portion 503 open in one direction are integrally molded.

Moreover, the reducer 500 produced as trial is provided with a hole 506 in the support member 502, and a shaft member 510 is press-fitted into the hole 506 to be fixed. Furthermore, in this structure, the shaft member 510 supported by the support member 502 pivotally supports the planetary gear 511. This structure enables the arm member 501 to be detached from an interlocking gear 512, and makes work easier to introduce the grease to the grease containing portion. Moreover, since only pivotally supporting is needed for the shaft member 510, a higher rigidity is not required than when the grease containing portion is provided in the interlocking gear. Thus, machining of the grease containing portion becomes also easier.

However, in the case of the reducer 500 produced as trial, since a thickness of the support member 502 configured to support the shaft member 510 is small, and a burden by a weight of the grease inside the grease containing portion 503 is also applied to the hole 506 of the support member 502, driving for a long time causes a new problem that the arm member 501 comes off from the shaft member 510.

Consequently, in light of the above-described new problem, an object of the present invention is to provide a motor-incorporating roller capable of preventing a grease supply portion from being separated.

Solution to Problem

One aspect of the present invention to solve the above-described problem is a motor-incorporating roller including a cylindrical roller body that includes a motor and a reducer therein, the reducer including: a gear train having a plurality of gears; and a grease supply portion capable of containing grease therein and supplying the grease to the plurality of gears, the motor-incorporating roller further including: power output member outputting power; and a shaft portion pivotally supporting the gears, wherein the grease supply portion is integrated with the power output member through the shaft portion to restrict movement of the shaft portion in an axial direction.

According to the present aspect, since the grease can be supplied to the gears from the grease supply portion, lubrication between the gears can be kept, so that increase in frictional resistance due to grease shortage can be prevented. This brings about a motor-incorporating roller having high power transmission efficiency.

Moreover, according to the present aspect, since the movement of the grease supply portion in the axial direction of the shaft portion is restricted, the grease supply portion can be prevented from separating from the shaft portion during driving.

Furthermore, according to the present aspect, the grease supply portion is a separate body from the power output member, the grease can be replenished into the grease supply portion in a state separated from the power output member. This improves workability.

In a preferable aspect, the shaft portion and the grease supply portion are engaged directly or through an alternative member in the axial direction.

According to the present aspect, since the shaft portion and the grease supply portion are engaged directly or indirectly in the axial direction, the separation of the grease supply portion from the shaft portion in the axial direction of the shaft portion can be prevented.

In a preferable aspect, the grease supply portion has a plate-like support portion, the plate-like support portion has an attachment hole to which the shaft portion can be attached, there is a protrusion on at least one of an inner wall surface of the attachment hole and an outer peripheral surface of the shaft portion, and a part of the shaft portion enters an inside of the attachment hole, so that the inner wall surface of the attachment hole and the outer peripheral surface of the shaft portion are engaged with each other by the protrusion.

A "hole" in the present specification includes both a bottomed hole and a through hole.

According to the present aspect, the one protrusion contributes to the mutual engagement between the inner wall surface of the attachment hole and the outer peripheral surface of the shaft portion. Thus, according to the present aspect, the shaft portion is hard to come off from the attachment hole of the plate-like support portion.

In a preferable aspect, the protrusion is a protruding ridge extending continuously or intermittently in a circumferential direction of the shaft portion.

According to the present aspect, the shaft portion is harder to come off from the plate-like support portion in the axial direction.

In a preferable aspect, the plate-like support portion is formed of resin.

According to the present aspect, since the plate-like support portion is made of the resin, and permits some deflection of the plate-like support portion, as compared with a plate-like support portion made of metal, the shaft portion is easier to attach and detach.

In a preferable aspect, the grease supply portion has a plate-like support portion, the plate-like support portion has an attachment hole to which the shaft portion can be attached, the shaft portion is inserted into the attachment hole so that an end portion thereof is projected from the attachment hole, and the alternative member is attached to a projected portion of the shaft portion.

According to the present aspect, since the grease supply portion and the shaft portion are engaged through the alternative member attached to the projected portion, the shaft portion is hard to come off from the attachment hole of the plate-like support portion in the axial direction.

In order to supply the grease to the gears over a long time, a certain amount of, or more grease needs to be introduced to the grease supply portion.

However, in the structure of the motor-incorporating roller according to Patent Document 1, a method for introducing the grease to the grease containing portion is not clearly disclosed. Thus, when the motor-incorporating roller described in Patent Document 1 is carried out, there are no way but to use introduction equipment such as a syringe and the like for the introduction from a grease supply hole or the like. Therefore, there has been a problem that introduction of the grease to the grease supply portion is troublesome.

Consequently, in a preferable aspect, the grease supply portion includes a grease containing portion capable of containing the grease therein, the grease containing portion has an introduction hole capable of introducing the grease from outside, and when the grease supply portion and the power output member are integrated, a part of the power output member closes an opening of the introduction hole of the grease containing portion.

According to the present aspect, since the grease containing portion has the introduction hole configured to introduce the grease, the grease can be easily introduced at the time of assembling.

According to the configuration of the present aspect, since the introduction hole is closed by the positional relationship of the grease supply portion and the power output member, the grease can be prevented from being delivered from the introduction hole when the motor-incorporating roller is driven.

In a preferable aspect, an extension direction of the introduction hole is the same as the axial direction of the shaft portion.

According to the present aspect, the formation of the introduction hole is easy at the time of molding by injection molding or the like.

In a preferable aspect, the grease supply portion has a grease containing portion capable of containing the grease therein, the grease containing portion includes a grease supply hole capable of delivering the grease, and while driving, the grease supply portion revolves or rotates inside the roller body to supply the inside grease from the grease supply hole by a centrifugal force or a gravitational force.

According to the present aspect, since the inside grease is supplied from the grease supply hole by the centrifugal force or the gravitational force, the grease is caused to gradually leak out, which can prevent shortage of the grease of the gears. This makes it unnecessary to provide a separate supply mechanism of the grease in addition to the basic configuration.

The applied centrifugal force differs between an inner side and an outer side of the grease containing portion with respect to a rotation center of the grease supply portion. That is, if the grease supply holes having the same opening area are provided on the inner side and the outer side of the grease containing portion respectively, a delivery amount of the grease differs between the inner side and the outer side. This causes a possibility that the grease inside the grease containing portion is intensively delivered from the grease supply hole on the outer side.

Consequently, as a more preferable aspect, the grease containing portion includes a pair of the grease supply holes opposed to each other, the pair of the grease supply holes comprising a first grease supply hole and a second grease supply hole, the first grease supply hole is located nearer a rotation center of the grease supply portion than the second grease supply hole, and an opening area of the first grease supply hole is larger than an opening area of the second grease supply hole.

According to the present aspect, the grease supply hole located on the outer side, to which a larger centrifugal force is applied, as compared with the grease supply hole located on the inner side with respect to the rotation center, has the smaller opening area. This enables a proper amount of grease to be delivered through each of the grease supply holes.

In a preferable aspect, the grease containing portion has an introduction hole capable of introducing the grease from outside, and an opening area of the introduction hole is larger than an opening area of each of the grease supply holes.

According to the present aspect, since the opening area of the introduction hole is larger than the opening area of the grease supply hole, a larger amount of grease can be introduced into the grease containing portion, as compared with a case where the grease is introduced from the grease supply hole to the grease containing portion. Moreover, according to the present aspect, since the opening area of the introduction hole is larger than the opening area of the grease supply hole, the grease is easy to introduce into the grease containing portion.

In a preferable aspect, the gear train includes: a sun gear; a planetary gear; and an internal gear for orbit, the internal gear for orbit being located outside the sun gear, the planetary gear being engaged with both the sun gear and the internal gear for orbit to revolve around the sun gear, and the shaft portion pivotally supports the planetary gear.

According to the present aspect, a planetary gear mechanism is used, and when the motor rotates, this rotational force is reduced in the reducer, and is transmitted to the roller body to rotate the roller body. This enables an input shaft from the motor and an output shaft to an outside to be disposed on the same axis.

Effect of Invention

According to the motor-incorporating roller of the present invention, the grease containing portion can be prevented from separating during driving. Moreover, according to the motor-incorporating roller of the present invention, since the supply of the grease to the gears during driving is enabled, the lubrication between the gears and the other members can be maintained.

BRIEF DESCRIPTION OF DRAWINGS

FIGS. 7A and 7B are explanatory views of the planetary gear train in the first stage in FIG. 3, wherein FIG. 7A is a cross-sectional view along A-A, and FIG. 7B is a cross-sectional view along B-B.

FIGS. 10A and 10B are explanatory views of the planetary gear train in the second stage in FIG. 3, wherein FIG. 10A is a cross-sectional view along D-D, and FIG. 10B is a cross-sectional view along E-E.

BEST MODES FOR CARRYING OUT THE INVENTION

Hereinafter, a motor-incorporating roller 1 of a first embodiment of the present invention will be described. In the following description, a direction of a rotation axis of the motor-incorporating roller 1 is defined as an axial direction L, as long as there is no special description.

Figure 3:
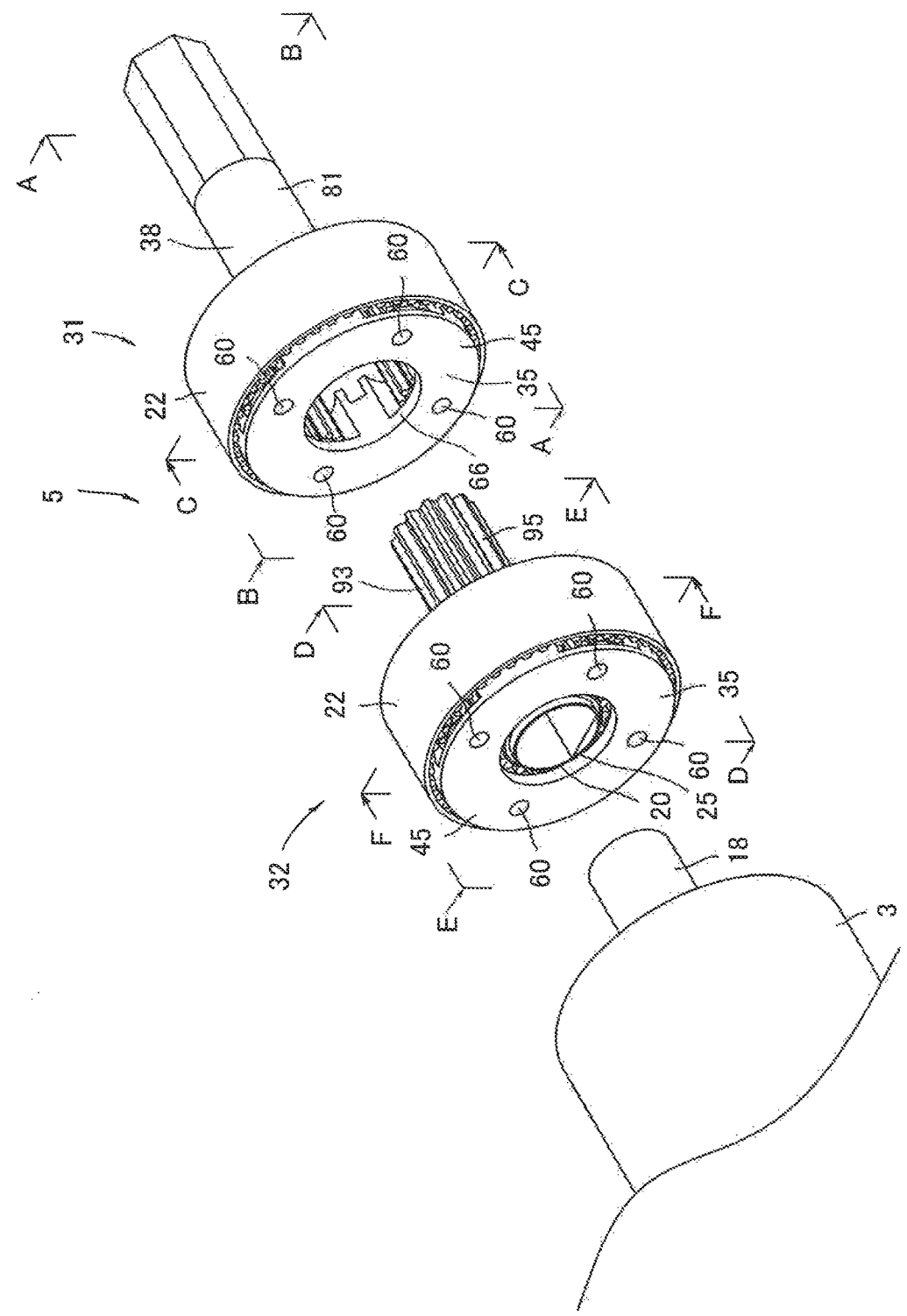
FIG. 3 is an exploded perspective view of a reducer in FIG. 1.
Figure 16:
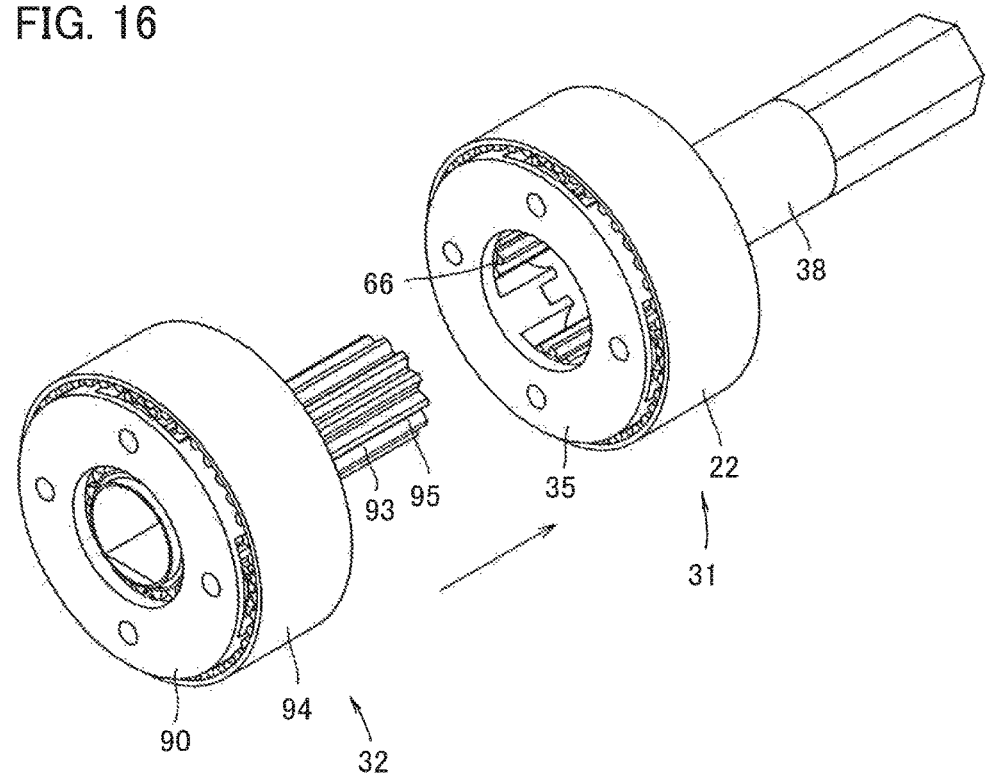
FIG. 16 is a perspective view when the planetary gear train in the second stage in FIG. 3 is attached to the planetary gear train in the first stage.

The motor-incorporating roller 1 of the present embodiment has a structure as a main characteristic, in which power output members 38, 93 and grease supply members 35, 90 are integrated inside a reducer 5, respectively, as read from FIGS. 3, 16. Prior to description of the reducer 5 having the above-described characteristic, a basic structure of the motor-incorporating roller 1 will be briefly described.

Figure 1:
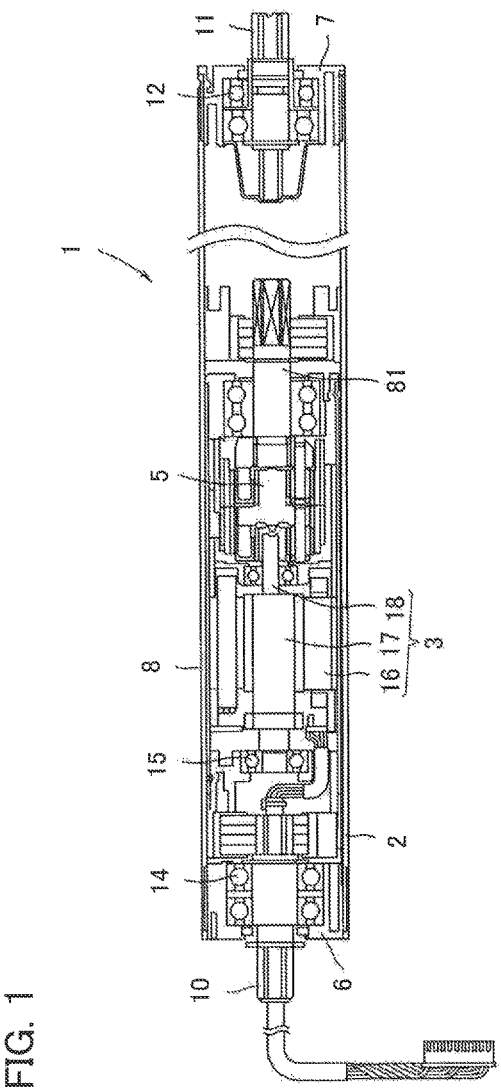
FIG. 1 is a cross-sectional view of a motor-incorporating roller of a first embodiment of the present invention.
Figure 2:
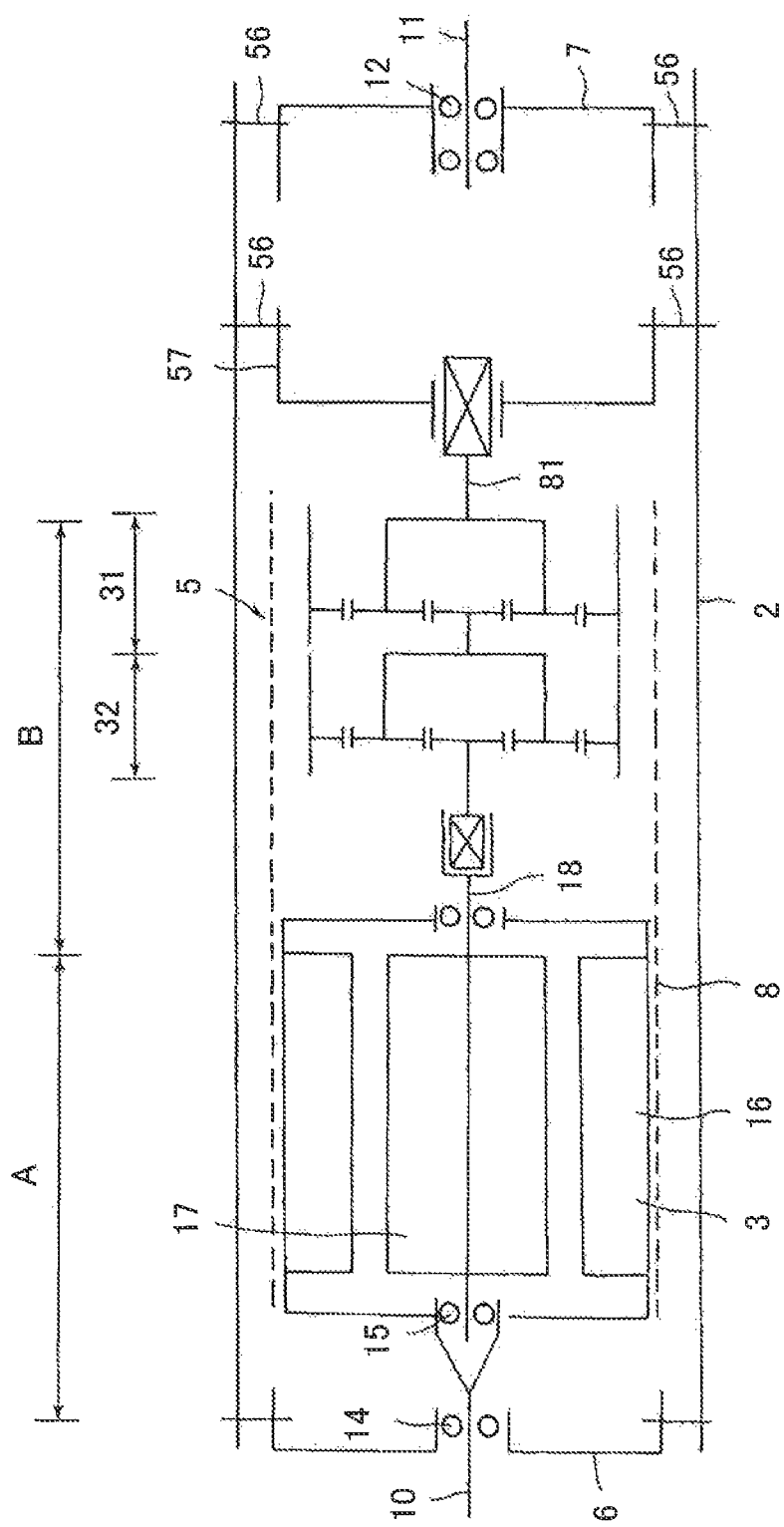
FIG. 2 is a mechanical block diagram of the motor-incorporating roller in FIG. 1.

The motor-incorporating roller 1 of the present embodiment has a motor 3 and the reducer 5 incorporated in a roller body 2, as read from FIGS. 1, 2. An inside of the roller body 2 is roughly divided into a motor portion A and a reducer portion B, as shown in FIG. 2.

The roller body 2 is a cylindrical body made of metal with both ends open, and closing members 6,7 are attached to both ends of the cylindrical body, as read from FIGS. 1 and 2. That is, both the ends of the roller body 2 are closed by the closing members 6, 7.

Fixed shafts 10, 11 are projected from both the ends of the roller body 2 in the axial direction, as shown in FIG. 2.

The fixed shaft 11 on one side (on the right side of the drawing in FIG. 2) is a rod-like member, and is rotatably attached to the closing member 7 by a double bearing 12. That is, the fixed shaft 11 is attached to the closing member 7 in a cantilever state, and is relatively rotatable to the closing member 7.

Moreover, the fixed shaft 11 only projects outward from the closing member 7, and does not extend to the inside of the roller body 2.

The fixed shaft 10 on the other side (on the left side of the drawing in FIG. 2) communicates from outside to inside of the roller body 2, and occupies a large volume inside the roller body 2 as well.

The fixed shaft 10 is rotatably attached to the closing member 6 through a bearing 14 to communicate from outside to inside of the roller body 2. The fixed shaft 10 has a diameter expanded inside the roller body 2, and an inner cylindrical member 8 is integrally attached to an outer peripheral portion of the fixed shaft 10. That is, a part of the fixed shaft 10 is contained inside the inner cylindrical member 8. Inside the inner cylindrical member 8, the motor 3 and the reducer 5 are incorporated, as shown in FIG. 2.

The motor 3 is made up of a stator 16, a rotor 17, and an output shaft 18, as shown in FIG. 2.

The stator 16 is a coil contained in an iron core, and is inserted into the inner cylindrical member 8 to be integrally attached to the inner cylindrical member 8.

The rotor 17 is located at a center of the inner cylindrical member 8 in a radial direction (a direction perpendicular to the axial direction), and one end thereof is rotatably supported by the fixed shaft 10 on another side (on the left side of the drawing in FIG. 2) through a bearing 15.

Subsequently, the reducer 5, which is a characteristic portion of the present invention, will be described.

As described above, the motor-incorporating roller 1 of the first embodiment of the present invention is characterized by the structure inside the reducer 5.

The reducer 5 is formed of planetary gear trains 31, 32 in two stages, as shown in FIG. 3. In the reducer 5, a first sun gear 20 (a sun gear) of the planetary gear train 32 is attached to the output shaft 18 of the motor 3, and rotation of the first sun gear 20 is received and transmitted to the fixed shaft 10 (refer to FIG. 2).

Figure 4:
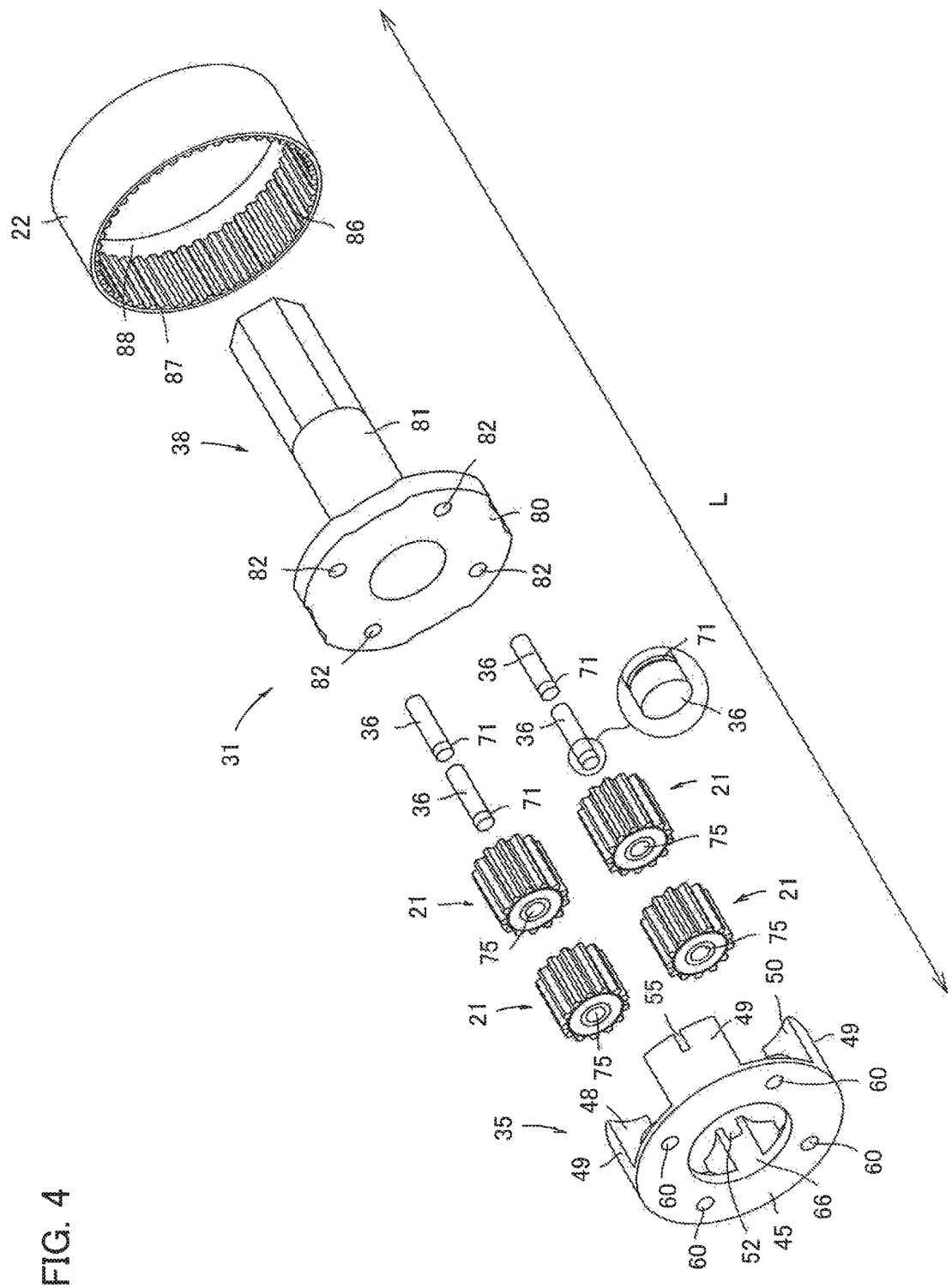
FIG. 4 is an exploded perspective view of a planetary gear train in a first stage in FIG. 3.

As shown in FIG. 4, the planetary gear train 31 in the first stage has a first grease supply member 35 (a grease supply portion), first shaft members 36 (a shaft portion), first planetary gears 21 (a gear, a planetary gear), a first power output member 38 (a power output member), and a first internal gear for orbit 22 (a first internal gear for orbit).

Figure 5:
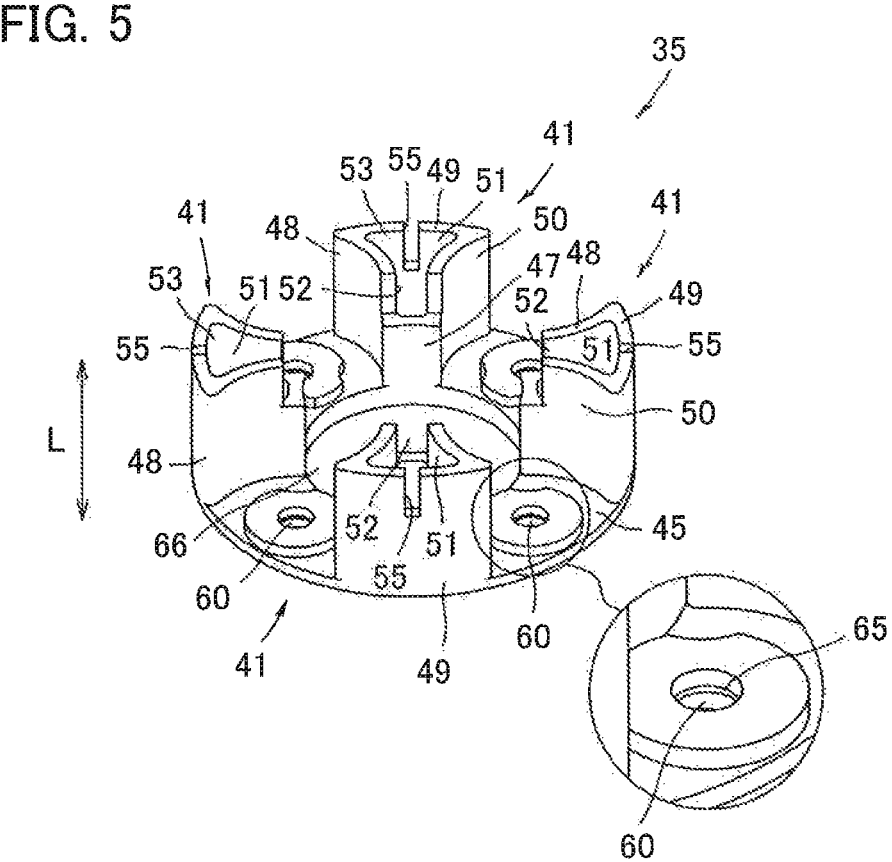
FIG. 5 is a perspective view when a grease supply member in FIG. 4 is viewed from a different direction.
Figure 6:
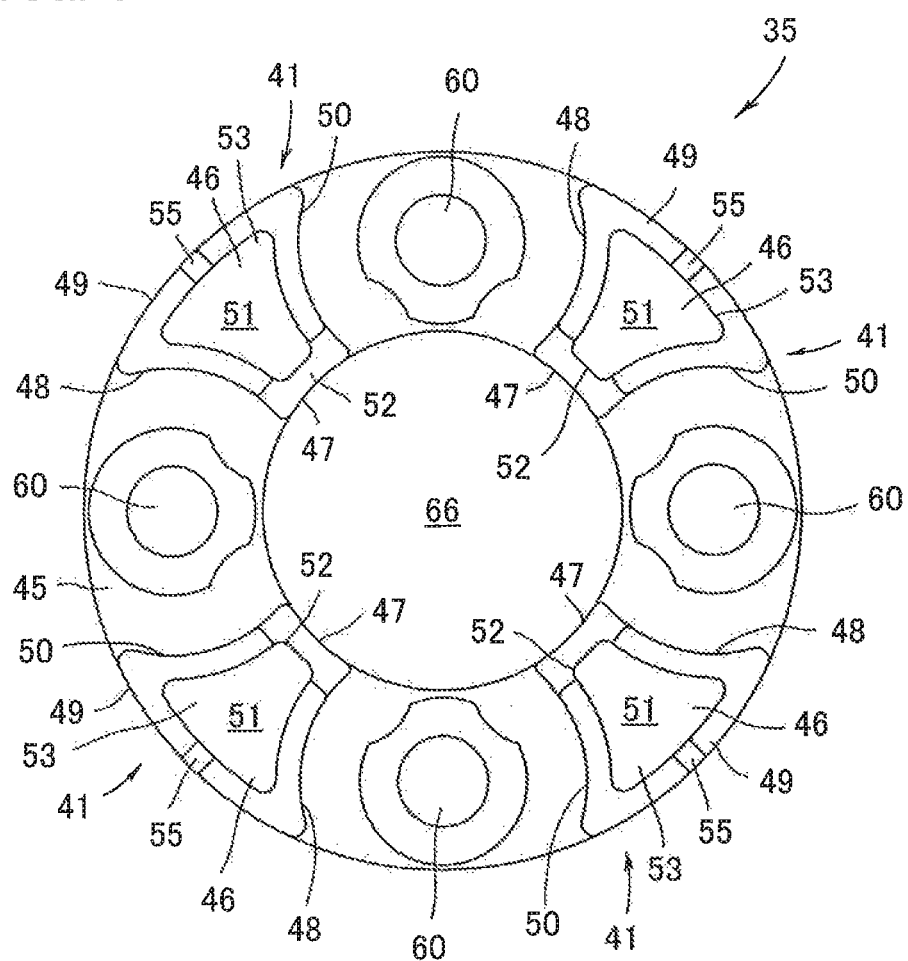
FIG. 6 is a plan view of the grease supply member in FIG. 4.

The first grease supply member 35 is an annular member in planar view from the axial direction L, and has a plurality of grease containing portions 41 and a plate-like support portion 45, as shown in FIGS. 5, 6.

The grease containing portions 41 are each a portion capable of containing the grease therein, and each have an outer shape of a fan in planar view.

As shown in FIG. 6, each of the grease containing portions 41 is formed of a bottom wall portion 46, which is a part of a plate-like support portion 45, and peripheral wall portions 47, 48, 49, 50 erected from edges of the bottom wall portion 46 along respective sides of the bottom wall portion 46, and an inside of the grease containing portion 41 is hollow.

That is, as shown in FIG. 6, the grease containing portion 41 has a containing space 51 surrounded by the bottom wall portion 46 and the four peripheral wall portions 47 to 50, and the relevant containing space 51 is open from the bottom wall portion 46 in one direction (the axial direction L), as shown in FIG. 5. In other words, the grease containing portion 41 has an introduction opening 53 (an introduction hole) formed by end surfaces of the peripheral wall portions 47 to 50. This introduction opening 53 faces the axial direction L.

As shown in FIG. 6, of the four surfaces of the peripheral wall portions 47 to 50, the peripheral wall portion 47 is a wall surface facing the center side in the radial direction, and a shape thereof is a arc-shaped surface.

Most of the peripheral wall portion 47 is open, and has a grease supply hole 52 penetrating in a member thickness direction (the radial direction).

The grease supply hole 52 is a hole capable of delivering the grease inside the containing space 51 to an outside. Specifically, as shown in FIG. 5, the grease supply hole 52 is a cutout obtained by cutting out from a forefront end side (an introduction opening 53 side) of the peripheral wall portion 47 toward a base end side (a bottom wall portion 46 side), and has a rectangular shape extending linearly from the introduction opening 53 in the axial direction L.

The peripheral wall portion 49 is a wall surface opposed to the peripheral wall portion 47 with the containing space 51 interposed, and a shape thereof is a circular arc, as read from FIGS. 5, 6.

The peripheral wall portion 49 has a grease supply hole 55 penetrating in the member thickness direction (the radial direction).

The grease supply hole 55 is a hole configured to be paired with the grease supply hole 52 of the peripheral wall portion 47, and is disposed at an opposed position with the containing space 51 interposed. The grease supply hole 55 is a hole capable of delivering the grease in the containing space 51 to an outside. As shown in FIG. 5, the grease supply hole 55 is a cutout obtained by cutting out from the forefront end side (the introduction opening 53 side) toward the base end side (the bottom wall portion 46 side) of the peripheral wall portion 49, and is a slit linearly extending from the introduction opening 53 in the axial direction L.

An opening area of the grease supply hole 55 is set as needed in accordance with a centrifugal force or the like applied to the grease containing portion 41. Preferably, the opening area of the grease supply hole 55 is 30% or more and 120% or less of the opening area of the grease supply hole 52 in the peripheral wall portion 47, and more preferably, 50% or more and less than 100%.

This range enables a grease 100 to be delivered properly by revolution of the first grease supply member 35 during driving of the motor-incorporating roller 1.

In the present embodiment, the opening area of the grease supply hole 55 belonging to the peripheral wall portion 49 on the outer side is smaller than the opening area of the grease supply hole 52 in the peripheral wall portion 47 on the inner side.

The peripheral wall portion 48 is a wall connecting end portions of the peripheral wall portions 47, 49 on one side in a circumferential direction.

As shown in FIG. 6, the peripheral wall portion 50 is a wall opposed to the peripheral wall portion 48 with the containing space 51 interposed, and connecting end portions of the peripheral wall portions 47, 49 on another side in the circumferential direction.

The peripheral wall portions 48, 50 are curved in a direction where they approach each other. Specifically, when the planetary gear train 31 is assembled, the peripheral wall portions 48, 50 are curved so as to avoid outer peripheral surfaces of the first planetary gears 21.

The introduction opening 53 has a larger opening area than those of the grease supply holes 52, 55 so as to be able to introduce the grease from an outside.

The plate-like support portion 45 is a plate-like member extending annularly, as read from FIGS. 4, 5, and is a wall portion forming a surface perpendicular to the axial direction L. The plate-like support portion 45 is made of resin. The plate-like support portion 45 has attachment holes 60 at positions deviated from the grease containing portions 41 in the circumferential direction.

As shown in FIG. 5, each of the attachment holes 60 is a through hole penetrating the plate-like support portion 45 in a member thickness direction, and has, in an inner peripheral surface thereof, a first engagement portion 65 (a protrusion) that protrudes toward a center.

The first engagement portion 65 is a protrusion having a square-shaped cross section in a direction perpendicular to the axial direction L, and is a protruding ridge extending continuously or intermittently in a circumferential direction, as read from FIGS. 5, 7. That is, an inner side surface of each of the attachment holes 60 has a continuous surface in a step shape.

Moreover, the plate-like support portion 45 has, at a center, a through hole 66 into which an interlocking gear 95 in a second stage can be inserted, as shown in FIG. 5. The through hole 66 is located at a position surrounded by the respective grease containing portions 41 and the attachment holes 60 alternately in the circumferential direction. The through hole 66 is a circular hole, and penetrates the plate-like support portion 45 in the member thickness direction.

Figure 12:
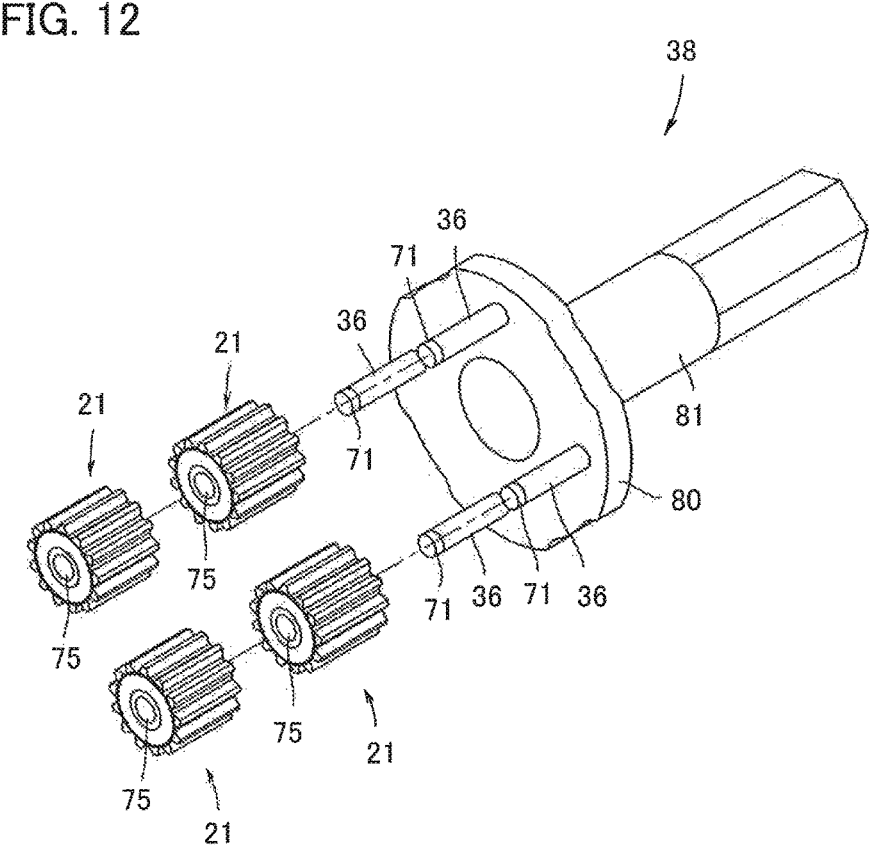
FIG. 12 is an explanatory view when the planetary gear train in the first stage in FIG. 3, and a perspective view when the first shaft members are attached to the first power output member, and the first planetary gears are attached.
Figure 13:
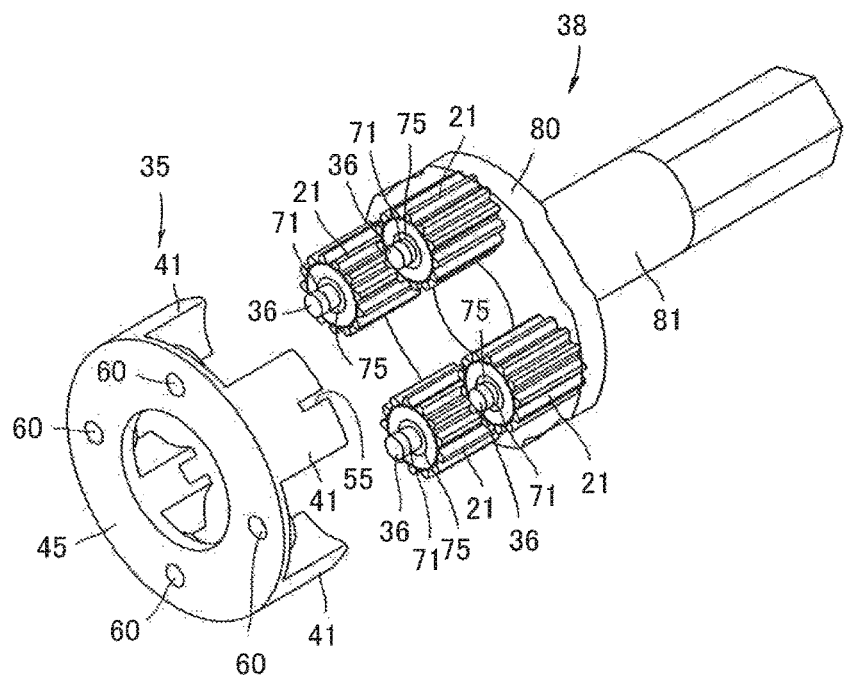
FIG. 13 is an explanatory view when the planetary gear train in the first stage in FIG. 3 is assembled, and a perspective view when the grease supply portion is attached to the first shaft members.

The first shaft members 36 are each a member pivotally supporting the first planetary gear 21 to function as a planetary shaft, as read from FIGS. 4, 12, 13. Each of the first shaft members 36 is a rod-like member extending linearly in the axial direction L, and is a member having a circular cross section perpendicular to the axial direction L.

As shown in FIG. 4, the first shaft member 36 has, in an outer peripheral surface thereof, a second engagement portion 71 extending continuously or intermittently in a circumferential direction.

Figure 7A:
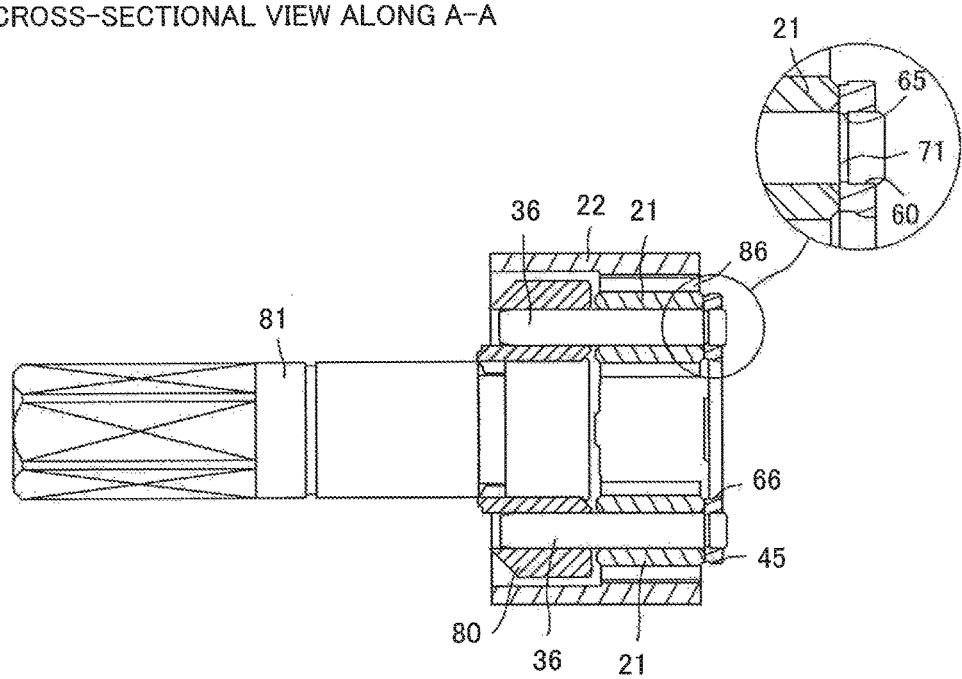

As shown in FIG. 7A, the second engagement portion 71 is a groove located in the vicinity of an end portion of the first shaft member 36 on one side, and outside the first planetary gear 21 in the axial direction L when the first planetary gear 21 is attached.

The second engagement portion 71 is a portion paired with the first engagement portion 65 of the plate-like support portion 45, and can be engaged with each other. Specifically, the second engagement portion 71 is a groove having a square-shaped opening in a cross section perpendicular to the axial direction L, and is a recessed groove extending continuously or intermittently in the circumferential direction.

The first planetary gear 21 is an external gear as shown in FIG. 4, and includes, in a central portion, an insertion hole 75 into which the first shaft member 36 is inserted.

The insertion hole 75 is a through hole having an circular opening shape in a cross section perpendicular to the axial direction L, and an opening area of the insertion hole 75 is a little larger than an cross-sectional area of the first shaft member 36.

The first power output member 38 is a member configured to transmit the power by the revolution of the first planetary gears 21 to a coupling member 57 (refer to FIG. 2). That is, the first power output member 38 has both a function as an arm configured to revolve the first planetary gears 21 and a function as an output member configured to output to the coupling member 57.

As shown in FIG. 4, the first power output member 38 has a body portion 80 and an interlocking shaft portion 81, and the body portion 80 and the interlocking shaft portion 81 are integrally formed.

The body portion 80 is a disk-like portion having a function as the arm configured to revolve the first planetary gears 21.

The body portion 80 has fixing holes 82 configured to enable the first shaft members 36 to be attached.

The fixing holes 82 are each a hole configured to support the first shaft member 36, and a through hole penetrating in the axial direction L.

An opening area of each of the fixing holes 82 in a plane perpendicular to the axial direction L is slightly smaller than the cross-sectional area of the first shaft member 36. Thus, the first shaft member 36 is press-fitted into the fixing hole 82, by which the first shaft member 36 can be firmly fitted in the fixing hole 82.

A thickness of the body portion 80 is larger than a thickness of the plate-like support portion 45 of the first grease supply member 35, and has a sufficient thickness to hold the first shaft member 36.

The thickness of the body portion 80 is preferably 1.5 to 3 times as large as an outer diameter of the first shaft member 36. This range can prevent the body portion 80 from coming off from the first shaft member 36 during driving, and the thickness from being too large.

The interlocking shaft portion 81 is a portion having a function as an output member configured to output the power to the coupling member 57 (refer to FIG. 2).

The interlocking shaft portion 81 is a rod-like portion erected toward the axial direction L from the body portion 80. The interlocking shaft portion 81 functions as an output shaft, and rotates on its axis to enable the power to be transmitted to the coupling member 57.

As shown in FIG. 4, the first internal gear for orbit 22 is a substantially cylindrical internal gear extending in the axial direction L, and a member configured to limit movement of each of the first planetary gears 21 in a revolution direction.

In the first internal gear for orbit 22, a gear 86 is formed in an inner peripheral surface in the vicinity of one opening end, and in the remaining inner peripheral surface, the gear 86 is not formed. That is, the inner peripheral surface of the first internal gear for orbit 22 is formed of a gear formed portion 87 where the gear 86 is formed, and a smooth cylindrical surface portion 88.

Subsequently, the planetary gear train 32 in the second stage will be described. Since it is generally the same as the planetary gear train 31 in the first stage in a configuration, similar members will be given similar reference numbers and will be briefly described.

Figure 9:
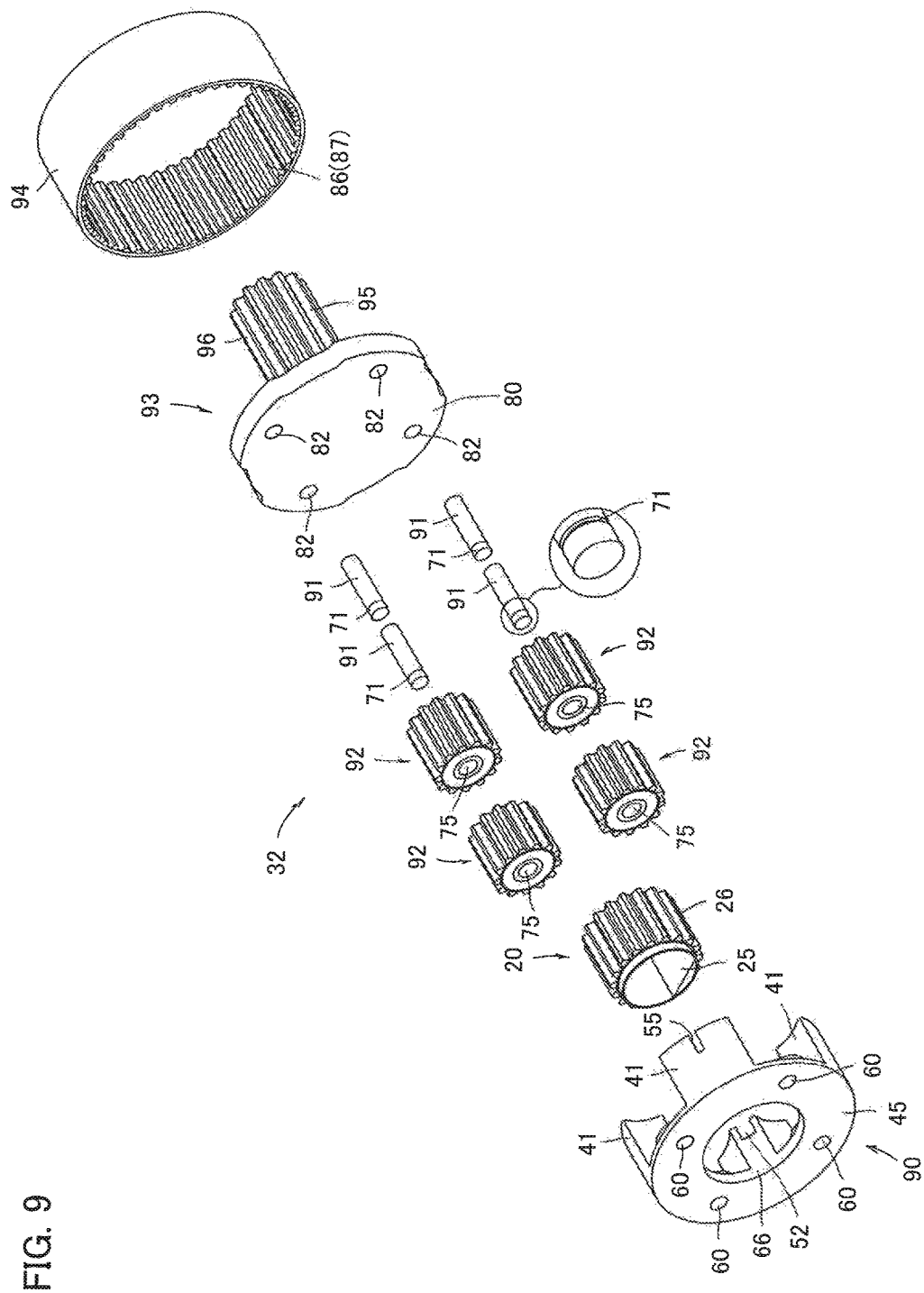
FIG. 9 is an exploded perspective view of a planetary gear train in a second stage in FIG. 3.

As shown in FIG. 9, the planetary gear train 32 in the second stage has the first sun gear 20, a second grease supply member 90, second shaft members 91 (a shaft portion), second planetary gears 92 (a gear, a planetary gear), a second power output member 93 (a power output member), and a second internal gear for orbit 94 (an internal gear for orbit).

As shown in FIG. 9, the first sun gear 20 is a cylindrical external gear, and has a bearing portion 25 to which the output shaft 18 of the motor 3 can be attached, and a gear portion 26 formed in an outer peripheral surface.

The second grease supply member 90 has a configuration similar to the first grease supply member 35, and has the plurality of grease containing portions 41 and the plate-like support portion 45.

Each of the second shaft members 91 is a member configured to function as a planetary shaft as each of the first shaft members 36, and is a rod-like member having a circular cross-sectional shape.

The second shaft member 91 has, in an outer peripheral surface, the second engagement portion 71 extending continuously or intermittently in a circumferential direction.

The second planetary gear 92 is a planetary gear similar to the first planetary gear 21, and includes, in a central portion, the insertion hole 75 into which the second shaft member 91 can be inserted.

The second power output member 93 is a member configured to transmit the power by revolution of the second planetary gears 92 to the first planetary gears 21 in the first stage. That is, the second power output member 93 has both a function as an arm configured to revolve the second planetary gears 92 and a function as an output shaft to the planetary gear train 31 in the first stage.

The second power output member 93 has the body portion 80 and the interlocking gear 95 (a sun gear).

The interlocking gear 95 is a rod-like portion erected from the body portion 80, and a gear 96 is provided in an outer peripheral surface thereof. That is, the interlocking gear 95 functions as an external gear, and rotates on its axis to enable the power to be transmitted to the first planetary gears 21.

The second internal gear for orbit 94 is a member almost similar to the first internal gear for orbit 22 and is a substantially cylindrical internal gear extending in the axial direction.

The second internal gear for orbit 94 is different from the first internal gear for orbit 22 in that the cylindrical surface portion 88 is not provided. That is, the second internal gear for orbit 94 is formed with the gear 86 in the whole thereof in the axial direction.

Subsequently, positional relationships of the respective members will be described in accordance with an assembling procedure of the motor-incorporating roller 1 of the present embodiment.

First, the planetary gear train 31 in the first stage is assembled.

Specifically, end portions on one side of the first shaft members 36 are press-fitted into the fixing holes 82 of the body portion 80 of the first power output member 38 to integrate the first shaft members 36 with the body portion 80.

At this time, since the body portion 80 has the sufficient thickness, as compared with the plate-like support portion 45 of the first grease supply member 35, the first shaft members 36 are firmly fitted in the fixing holes 82.

The first shaft members 36 may be adhered to the fixing holes 82, using an adhesive or the like as needed.

Next, the first shaft members 36 fixed to the body portion 80 of the first power output member 38 are inserted into the insertion holes 75 of the first planetary gears 21 to attach the first planetary gears 21, as read from FIG. 12.

At this time, an intermediate portion of each of the first shaft members 36 is inserted into the insertion hole 75 of the first planetary gear 21, as read from FIG. 13, so that the first planetary gear 21 is pivotally supported by the first shaft member 36.

Figure 8:
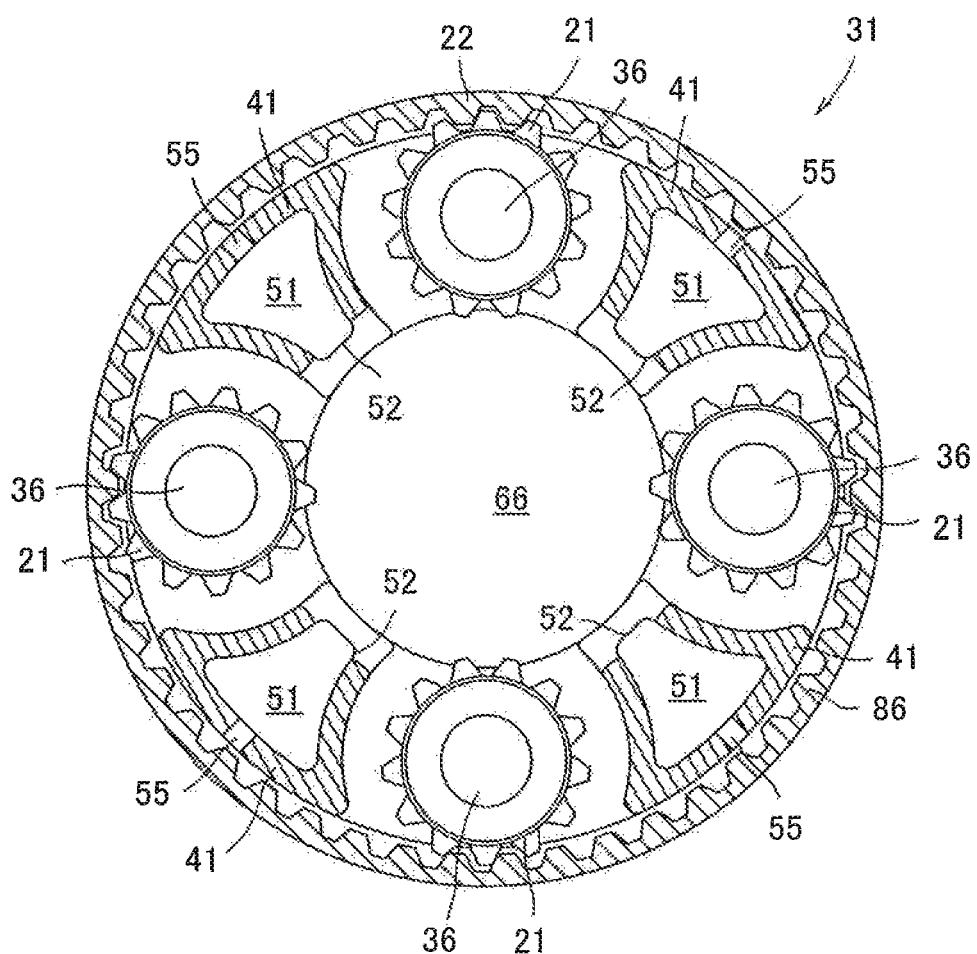
FIG. 8 is a cross-sectional view along C-C of the planetary gear train in the first stage in FIG. 3.

As shown in FIG. 8, the four first planetary gears 21 are arrayed at predetermined intervals in the circumferential direction. In the present embodiment, the four first planetary gears 21 are arranged at equal intervals so as to form a space at a center. That is, at a center of the planetary gear train 31, a space communicating with the through hole 66 is formed.

Moreover, in another process, in the first grease supply member 35, the grease 100 (refer to FIG. 17) is injected into the containing spaces 51 from the introduction openings 53 of the grease containing portions 41.

At this time, each of the containing spaces 51 is preferably filled with the grease 100 in a range of 80% or more, and 100% or less of a capacity of the containing space 51.

As shown in FIG. 13, the first grease supply member 35 filled with the grease inside the grease containing portions 41 is attached to the first power output member 38.

That is, as shown in FIG. 13, end portions on another side of the first shaft members 36 are inserted into the attachment holes 60 of the plate-like support portion 45 of the first grease supply member 35.

At this time, as shown in FIG. 7A, a part of the first shaft member 36 enters the attachment hole 60. Inside the attachment hole 60, the first engagement portion 65 of the attachment hole 60 is fitted in the second engagement portion 71 of the first shaft member 36, and in the axial direction, a side surface of the first engagement portion 65 and an inner wall surface of the second engagement portion 71 are engaged. That is, movement in the axial direction of the first grease supply member 35 with respect to the first shaft members 36 is restricted.

Moreover, as shown in FIG. 8, each of the grease containing portions 41 is arranged between the adjacent first planetary gears 21, 21. In other words, the grease containing portions 41 and the first shaft members 36 are arranged alternately and at equal intervals.

Figure 7B:
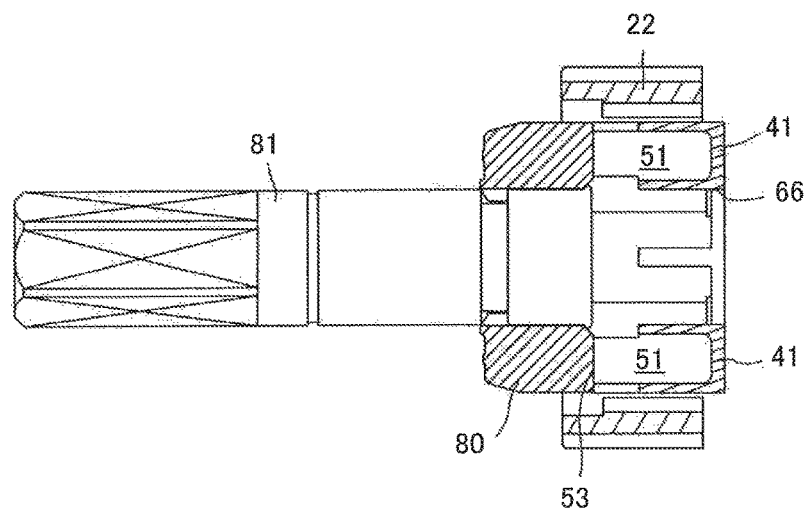

Moreover, the introduction openings 53 of the grease containing portions 41 are closed by the body portion 80 of the first power output member 38, as shown in FIG. 7B. That is, the body portion 80 of the first power output member 38 functions as a lid configured to close the grease containing portions 41.

Figure 15:
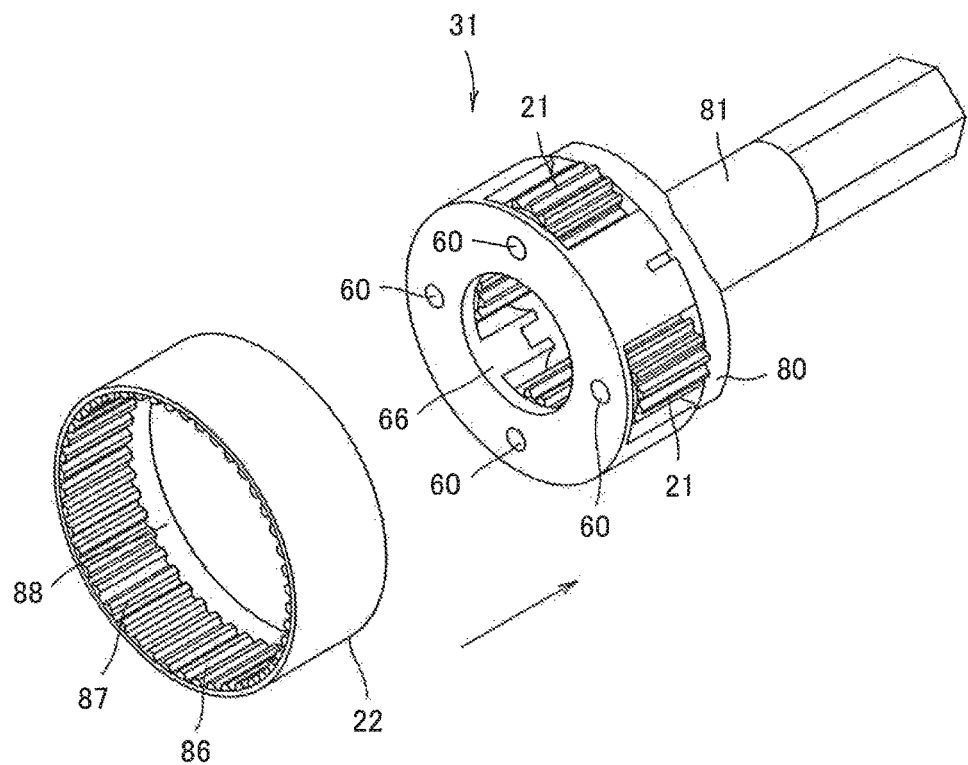
FIG. 15 is an explanatory view when the planetary gear train in the first stage in FIG. 3 is assembled, and a perspective view when the gear for orbit is attached.

Thereafter, as shown in FIG. 15, the first internal gear for orbit 22 is fixed so as to surround the four first planetary gears 21.

At this time, in the gear formed portion 87 of the first internal gear for orbit 22, the gear 86 meshes and engages with the first planetary gears 21.

The grease supply holes 52 of the grease containing portions 41 face the center, as shown in FIG. 8, and the grease supply holes 55 of the grease containing portions 41 face the first internal gear for orbit 22.

The first stage has been assembled as described above, and then, the second stage is also assembled similarly. The assembling of the second stage is generally similar to that of the first stage, and thus, only positional relationships of the respective members after the assembling will be described.

Figure 10A:
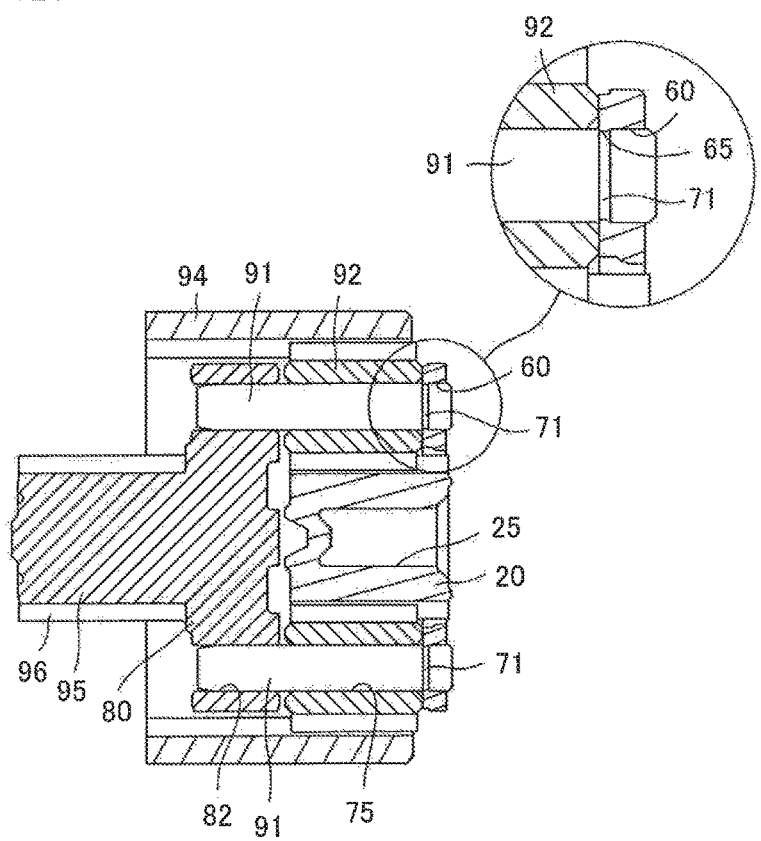
Figure 10B:
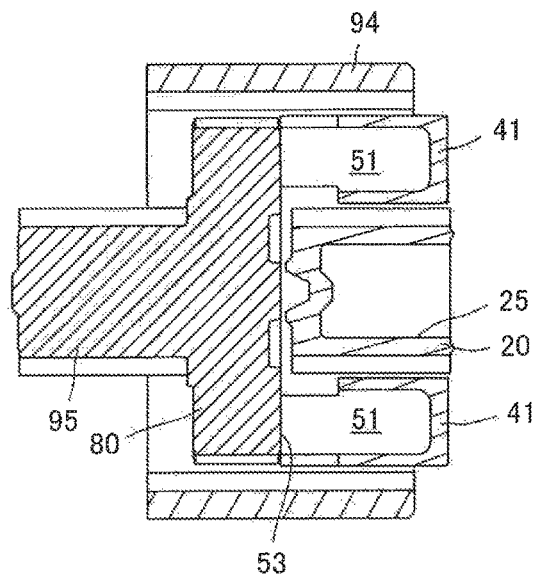

Moreover, the end portions on the one side of the second shaft members 91 are press-fitted into the fixing holes 82 of the body portion 80, as shown in FIG. 10A, and the end portions on another side of the second shaft members 91 are inserted into the attachment holes 60 of the plate-like support portion 45 of the second grease supply member 90.

Inside each of the attachment holes 60, the first engagement portion 65 of the attachment hole 60 is fitted in the second engagement portion 71 of the second shaft member 91, and in the axial direction, the side surface of the first engagement portion 65 and the inner wall surface of the second engagement portion 71 are engaged. That is, movement of the second grease supply member 90 with respect to the second shaft members 91 in the axial direction is restricted. Moreover, the introduction openings 53 of the grease containing portions 41 are closed by the body portion 80 of the second power output member 93.

Figure 11:
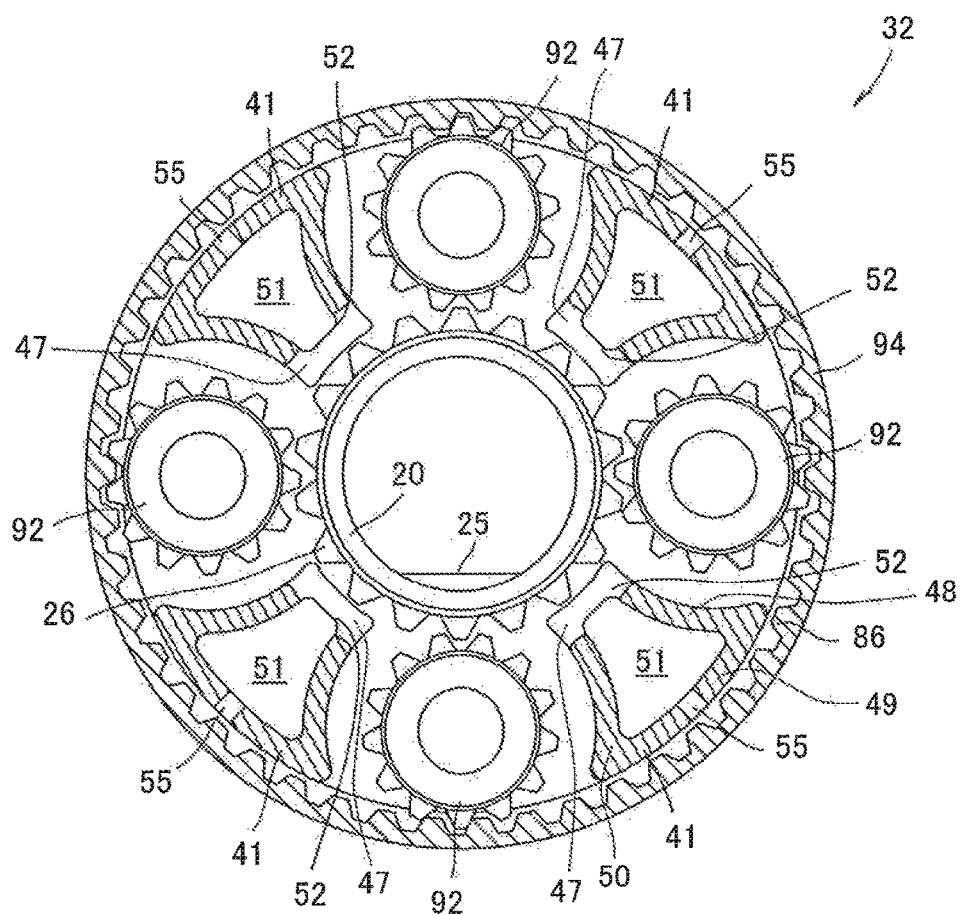
FIG. 11 is a cross-sectional view along F-F of the planetary gear train in the second stage in FIG. 3.

The first sun gear 20 is engaged with the four second planetary gears 92, as shown in FIG. 11. The four second planetary gears 92 are in a relationship of surrounding a periphery of the first sun gear 20. That is, the two second planetary gears 92 are opposed to each other with the first sun gear 20 interposed, and the two remaining second planetary gears 92 are also opposed to each other with the first sun gear 20 interposed. The gear portion 26 of the first sun gear 20 mutually meshes with and is fitted in the respective second planetary gears 92.

Moreover, each of the grease containing portions 41 is located at a position sandwiched by the adjacent second planetary gears 92, 92, and is located in a space surrounded by the first sun gear 20 and the second internal gear for orbit 94. That is, the grease containing portions 41 are each in a space surrounded by the first sun gear 20, the two second planetary gears 92, 92, and the second internal gear for orbit 94.

The peripheral wall portions 47 having a small diameter, which face the center side, face the first sun gear 20. The peripheral wall portions 49 having a large diameter face the second internal gear for orbit 94. The arc-shaped peripheral wall portions 48, 50 face the second planetary gears 92, 92, respectively.

In the gear formed portion 87 of the second internal gear for orbit 94, the gear 86 meshes and engages with the respective second planetary gears 92. The grease supply holes 52 of the grease containing portions 41 face the center side. The grease supply holes 55 of the grease containing portions 41 face the second internal gear for orbit 94.

The planetary gear train 32 is coupled to the planetary gear train 31 assembled as described above, as shown in FIG. 16.

That is, the interlocking gear 95 of the second power output member 93 is inserted into the through hole 66 of the plate-like support portion 45 of the first grease supply member 35 to engage the interlocking gear 95 and the four first planetary gears 21 with each other.

Figure 14:
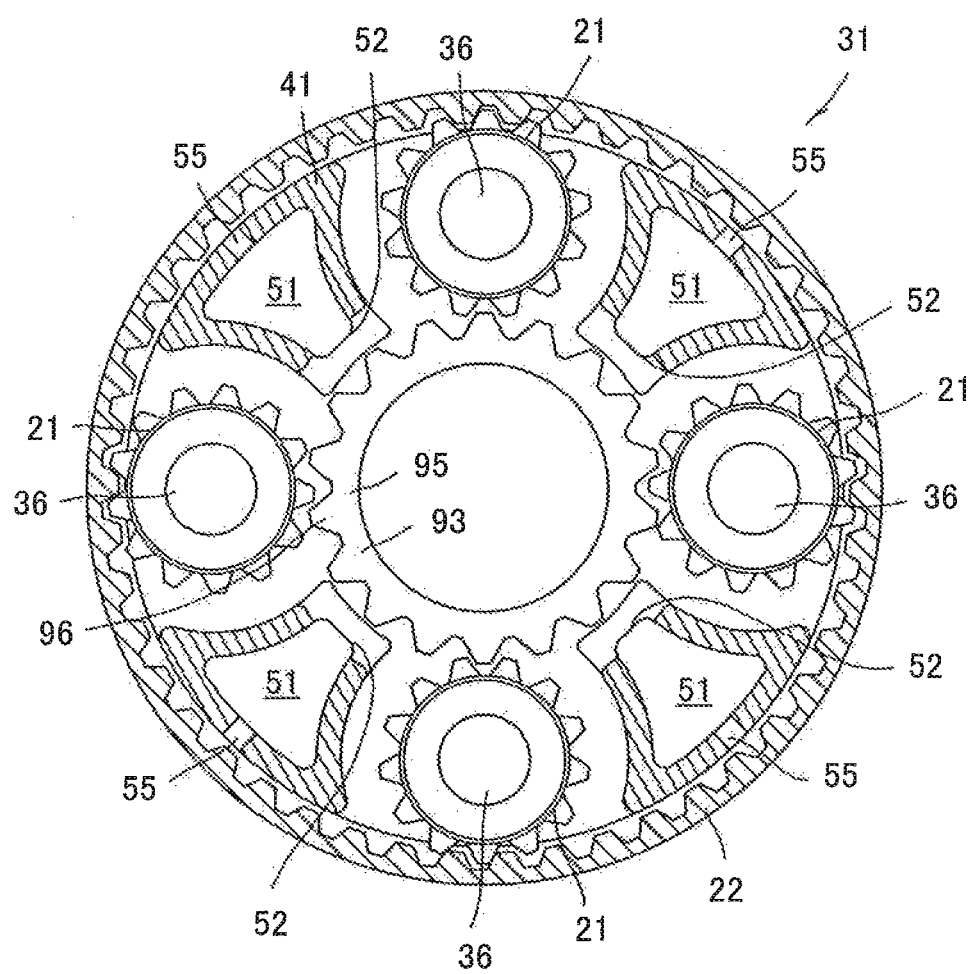
FIG. 14 is an explanatory view when the planetary gear train in the first stage in FIG. 3 is assembled, and a cross-sectional view of a state where the grease supply member has been attached to the first shaft members.

At this time, the four first planetary gears 21 are in a positional relationship of surrounding a periphery of the interlocking gear 95, as shown in FIG. 14. That is, the two first planetary gears 21 are opposed to each other with the interlocking gear 95 interposed, and the two remaining first planetary gears 21 are also opposed to each other with the interlocking gear 95 interposed. The interlocking gear 95 meshes with, and is fitted in the respective first planetary gears 21. Moreover, each of the grease containing portions 41 is located at a position sandwiched by the adjacent first planetary gears 21, 21, and is located in a space surrounded by the interlocking gear 95 and the first internal gear for orbit 22. That is, the grease containing portions 41 are each in a space surrounded by the interlocking gear 95, the two first planetary gears 21, 21, and the first internal gear for orbit 22. That is, the peripheral wall portions 47 having a small diameter and facing the center side face the interlocking gear 95. The peripheral wall portions 49 having a large diameter face the first internal gear for orbit 22. The arc-shaped peripheral wall portions 48, 50 face the first planetary gears 21, 21, respectively.

The motor 3 is connected to the planetary gear trains 31, 32 connected in series in the axial direction L. That is, the output shaft 18 of the motor 3 is inserted into the bearing portion 25 of the first sun gear 20.

Next, a grease supply mechanism of the motor-incorporating roller 1 of the present embodiment will be described.

Figure 17:
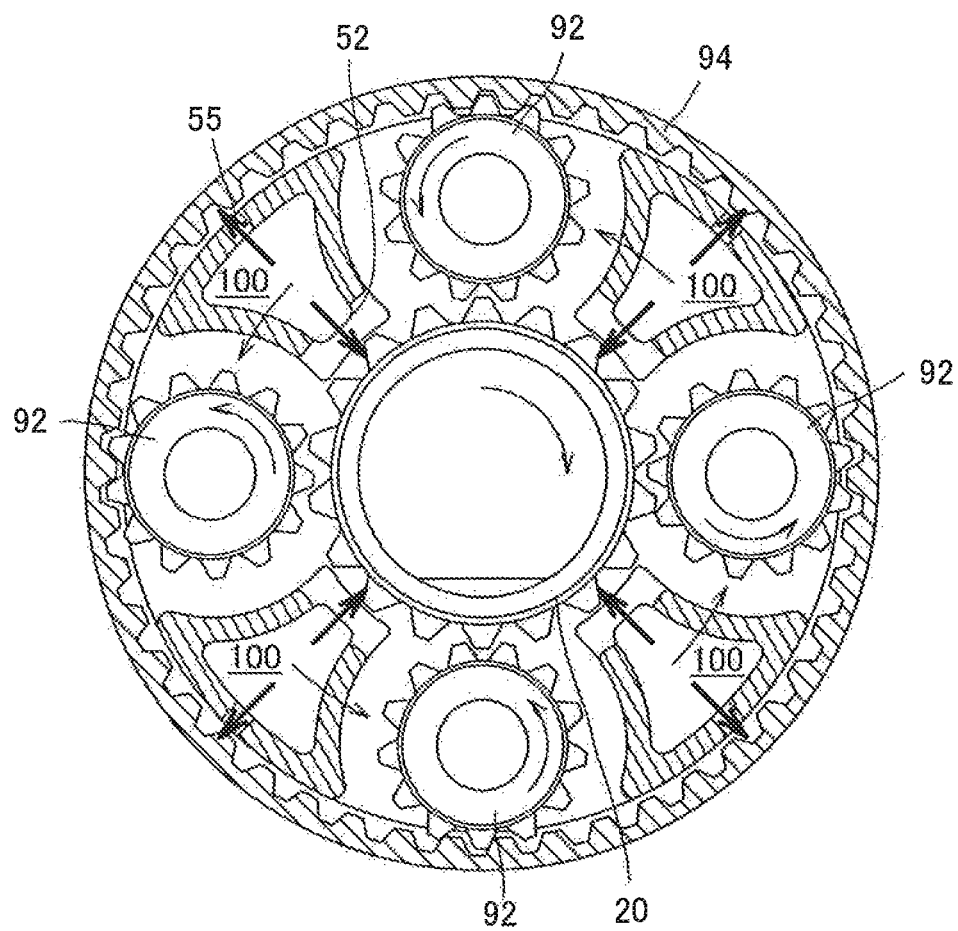
FIG. 17 is an explanatory view of supply passages of the grease in the reducer in FIG. 1.

In the motor-incorporating roller 1, when the rotor 17 of the motor 3 rotates, the first sun gear 20 connected to the output shaft 18 of the motor 3 rotates, as indicated by solid line in FIG. 17, and a speed is reduced at a predetermined reduction ratio to rotate the interlocking shaft portion 81 (refer to FIG. 3), which is the output shaft of the reducer 5. A rotational force of the interlocking shaft portion 81 is transmitted to the coupling member 57 and further transmitted to the roller body 2, so that the roller body 2 rotates with respect to the fixed shafts 10, 11.

Moreover, the interlocking gear 95 is connected to the coupling member 57, and the rotation of the interlocking gear 95 is received by the coupling member 57. The coupling member 57 is attached to the roller body 2 through a pin 56, and the rotation of the interlocking gear 95 is transmitted to the roller body 2 via the coupling member 57 and the pin 56.

In the motor-incorporating roller 1 of the present embodiment, as indicated by thick line in FIG. 17, the grease 100 is supplied to the respective gears 20, 92, 95, 21, 22 from the grease supply holes 52, 55, 52, 55 of the grease containing portions, 41, 41 during activation, or before and after activation/stop.

That is, when the motor-incorporating roller 1 is activated, and the output shaft 18 of the motor 3 rotates, the relationship between the first sun gear 20 and the second planetary gears 92 allows the plate-like support portion 45 and the body portion 80 to rotate, so that the grease containing portions 41 rotate.

Specifically, the grease containing portions 41 revolve around the first sun gear 20 together with the second planetary gears 92, as indicated by solid line in FIG. 17. As a result, as indicated by thick line in FIG. 17, the grease 100 inside the grease containing portions 41 is shaken and leaks out from the grease supply holes 52, 55. Moreover, a centrifugal force, a gravitational force and the like allow the grease 100 to leak out from the grease supply holes 52, 55.

As described above, since the grease supply holes 52, 55 face the gears 20, 92, 94, respectively, the grease 100 leaking out from the respective grease supply holes 52, 55 is supplied to the respective gears, 20, 92, 94. As indicated by solid line in FIG. 17, the gears 20, 92, 94 rotate in this state, which compensates shortage of the grease 100 of the respective gears 20, 92, 94.

Moreover, in the first stage as well, with the rotation of the foregoing body portion 80, the interlocking gear 95 rotates, and the relationship between the interlocking gear 95 and the first planetary gears 21 allows the plate-like support portion 45 and the body portion 80 to rotate, so that the grease containing portions 41 rotate.

Specifically, the grease containing portions 41 revolve around the interlocking gear 95 together with the first planetary gears 21. As a result, the grease 100 inside the grease containing portions 41 is shaken and leaks out from the grease supply holes 52, 55. Moreover, a centrifugal force, a gravitational force and the like allow the grease 100 to leak out from the grease supply holes 52, 55.

In this manner, according to the motor-incorporating roller 1 of the present embodiment, the grease 100 is discharged little by little from the grease containing portions 41, 41 during driving to be supplied to the respective gears 20, 92, 94, 95, 21, 22. This makes it hard to cause grease shortage of the respective gears 20, 92, 94, 95, 21, 22, and can keep lubrication between the respective gears. Thus, according to the motor-incorporating roller 1 of the present embodiment, power transmission efficiency is high.

Moreover, according to the motor-incorporating roller 1 of the present embodiment, the first engagement portions 65 of the attachment holes 60 and the second engagement portions 71 of the first shaft members 36 are engaged in a rotation axis direction. Thus, the first power output member 38 hardly comes off from the first shaft members 36 during driving.

Similarly, according to the motor-incorporating roller 1 of the present embodiment, the first engagement portions 65 of the attachment holes 60 and the second engagement portions 71 of the second shaft members 91 are engaged in the rotation axis direction. Thus, the second power output member 93 hardly comes off from the second shaft members 91 during driving.

Furthermore, according to the motor-incorporating roller 1 of the present embodiment, the grease containing portions 41 each have the introduction opening 53 different from the grease supply holes 52, 55, and the grease containing portions 41 can be detached with respect to the first shaft members 36. Thus, according to the motor-incorporating roller 1, the grease 100 can be easily introduced to the containing spaces 51 of the grease containing portions 41.

As to the second stage as well, the grease containing portions 41 each have the introduction opening 53 different from the grease supply holes 52, 55, and the grease containing portions 41 can be detached with respect to the second shaft members 91. Thus, according to the motor-incorporating roller 1, the grease 100 can be easily introduced to the containing spaces 51 of the grease containing portions 41.

Subsequently, a motor-incorporating roller of a second embodiment will be described. Components similar to those in the first embodiment will be given the same reference numbers, and description thereof will be omitted. While a structure of the embodiment that will be described hereinafter can be employed for a planetary gear train 31 in a first stage and a planetary gear train 32 in a second stage, only the planetary gear train 31 in the first stage will be described for convenience of the description.

The motor-incorporating roller of the second embodiment is different from the motor-incorporating roller 1 of the first embodiment in a way of the engagement of the grease supply member and the first shaft members.

Figure 18:
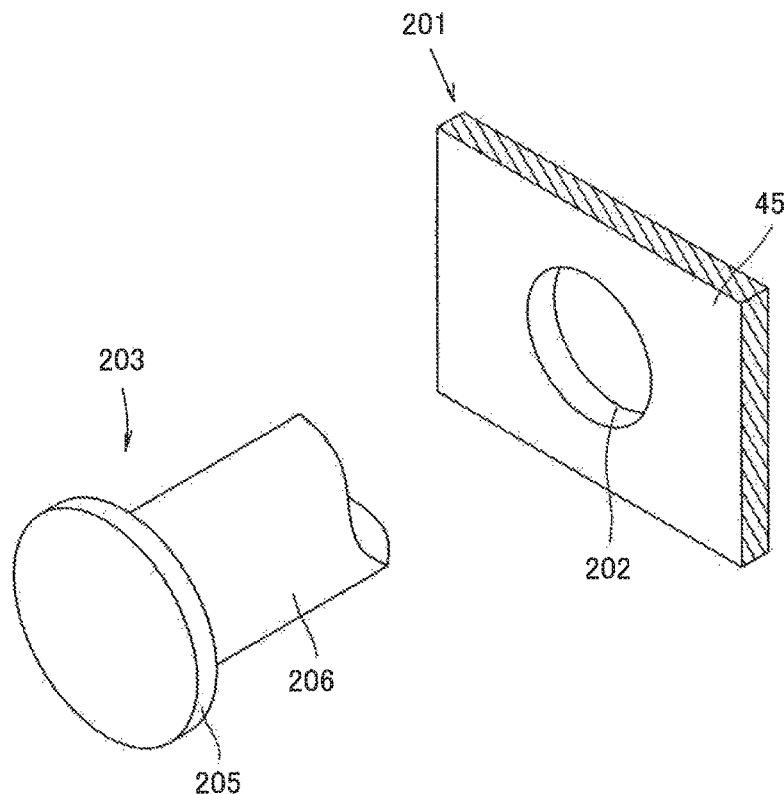
FIG. 18 is an exploded perspective view showing a substantial portion of a motor-incorporating roller in a second embodiment of the present invention.
Figure 19:
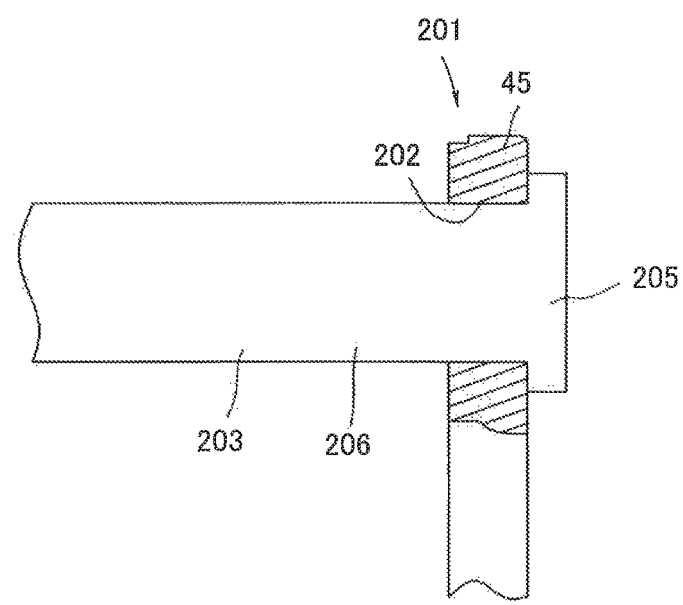
FIG. 19 is a cross-sectional view showing a substantial portion of the motor-incorporating roller of the second embodiment of the present invention.

An attachment hole 202 of a grease supply member 201 of the second embodiment is a simple through hole penetrating in a member thickness direction, as read from FIGS. 18, 19, and a second engagement portion 205 of a shaft member 203 is a flange.

That is, the shaft member 203 has a shaft portion 206 configured to support a planetary gear 21 and the second engagement portion 205.

A cross-sectional area (a cross section perpendicular to an axial direction) of the shaft portion 206 is not larger than a cross-sectional area of the attachment hole 202, and a cross-sectional area of the second engagement portion 205 (a cross section perpendicular to an axial direction) is larger than the cross-sectional area of the attachment hole 202.

In other words, the second engagement portion 205 can be also said to be a protruding ridge that protrudes in a radial direction from an outer peripheral surface of the shaft portion 206. The second engagement portion 205 extends continuously or intermittently in a circumferential direction, and in the present embodiment, it extends continuously.

Subsequently, an assembling procedure of the motor-incorporating roller of the second embodiment and positional relationships of the respective portions will be described.

In the assembling of the motor-incorporating roller of the second embodiment, the shaft member 203 is attached to the grease supply member 201 prior to a first power output member 38.

That is, as read from FIG. 19, the shaft portion 206 of the shaft member 203 is inserted into the attachment hole 202 from an opposite side of grease containing portions 41 of a plate-like support portion 45 to engage the second engagement portion 205 with the plate-like support portion 45 (a first engagement portion).

That is, a surface on the shaft portion 206 of the second engagement portion 205 abuts on, and engages with the plate-like support portion 45.

In this manner, the shaft portions 206 of the shaft members 203 attached to the grease supply member 201 are inserted into the first planetary gears 21, and projected portions thereof from the first planetary gears 21 are press-fitted into the fixing holes 82 of the first power output member 38.

According to the motor-incorporating roller of the second embodiment of the present invention, separation of the grease supply member 201 from the shaft member 203 is locked by the flange-like second engagement portion 205. Thus, a defect that the grease supply member 201 comes off does not occur.

Subsequently, a motor-incorporating roller of a third embodiment will be described. Components similar to those in the first and second embodiments will be given the same reference numbers, and description thereof will be omitted.

The motor-incorporating roller of the third embodiment is different from the motor-incorporating roller 1 of the first embodiment, and integration of a first grease supply member 35 and a first shaft member 36 is performed through another member.

Figure 20:
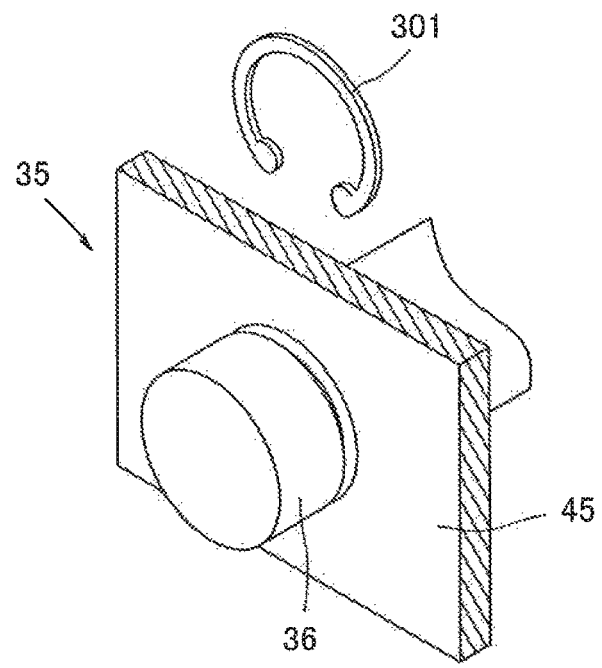
FIG. 20 is an exploded perspective view showing a substantial portion of a motor-incorporating roller of a third embodiment of the present invention.

That is, when the motor-incorporating roller is assembled, as shown in FIG. 20, in each of the shaft members 36, a forefront end portion thereof is projected from a plate-like support portion 45, so that a locking member 301 (the other member) is attached to the projected portion.

The locking member 301 is a retaining ring, and has an annular shape.

The separation of the grease supply member 35 with respect to the first shaft member 36 is locked by the locking member 301. That is, the first grease supply member 35 and the first shaft member 36 are in a mutually-locked relationship through the locking member 301 when assembled.

According to the motor-incorporating roller of the third embodiment, the first grease supply member 35 and the first shaft member 36 are engaged and integrated through the locking member 301, which is the other member. This makes disassembly easy at the time of maintenance or the like.

Subsequently, a motor-incorporating roller of a fourth embodiment will be described.

In the motor-incorporating roller of the fourth embodiment, a first grease supply member 35 and a shaft member are integrated by a locking member 402, which is another member.

Figure 21:
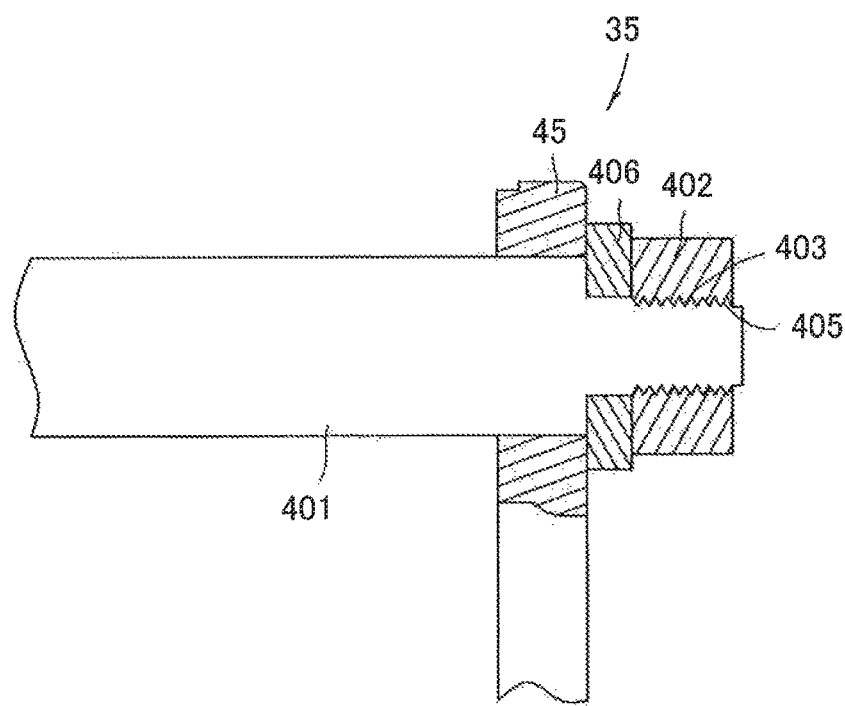
FIG. 21 is a cross-sectional view showing a substantial portion of a motor-incorporating roller of a fourth embodiment of the present invention.

A shaft member 401 of the fourth embodiment is different from the shaft member of the third embodiment, and is threaded in the vicinity of a forefront end portion to have a male screw portion 403, as shown in FIG. 21.

Moreover, the locking member 402 is paired with the male screw portion 403 of the shaft member 401, and has a female screw portion 405 threaded in an inner side surface and a washer 406.

When the motor-incorporating roller is assembled, a forefront end portion of the shaft member 401 is projected from the plate-like support portion 45, and the male screw portion 403 is located at the projected portion. The female screw portion 405 of the locking member 402 is screwed onto this male screw portion 403.

The plate-like support portion 45 and the shaft member 401 are engaged in an axial direction through the locking member 402.

A threading direction of the male screw portion 403 is preferably an opposite direction of a rotation direction of a planetary gear 21 (a planetary gear 92). This can prevent loosening caused by the rotation.

Figure 22:
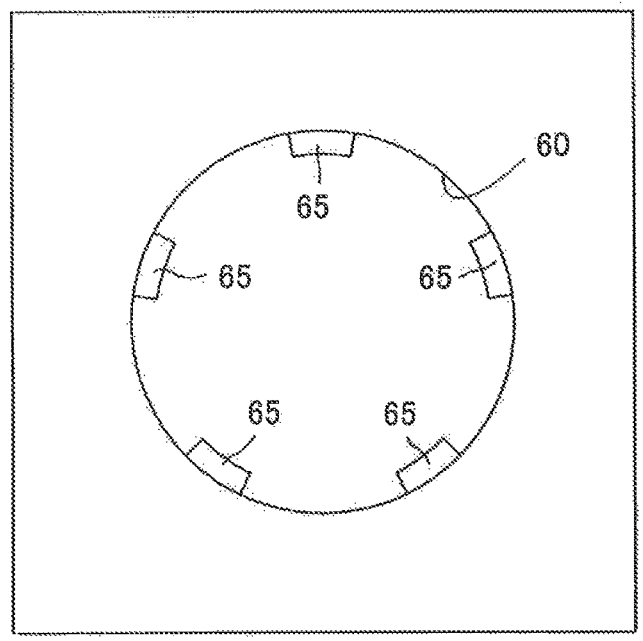
FIG. 22 is a plan view showing a power output member of a motor-incorporating roller of another embodiment of the present invention.

While in the above-described first embodiment, the first engagement portion 65 continuous in the circumferential direction has been illustrated in the drawings and the like, the present invention is not limited thereto, as described above. For example, as shown in FIG. 22, the first engagement portion 65 may be intermittently continued.

While in the above-described embodiment, the cross-sectional shape of the second engagement portion 71 is square, the present invention is not limited thereto, and the second engagement portion 71 only needs to be engaged with the first engagement portion 65 in the axial direction. For example, the second engagement portion 71 may be a groove having a V-shaped cross section, or may be a arc-shaped groove.

Moreover, the first engagement portion 65 may be a protrusion having a V-shaped cross section, or may be a arc-shaped protrusion.

Figure 23:
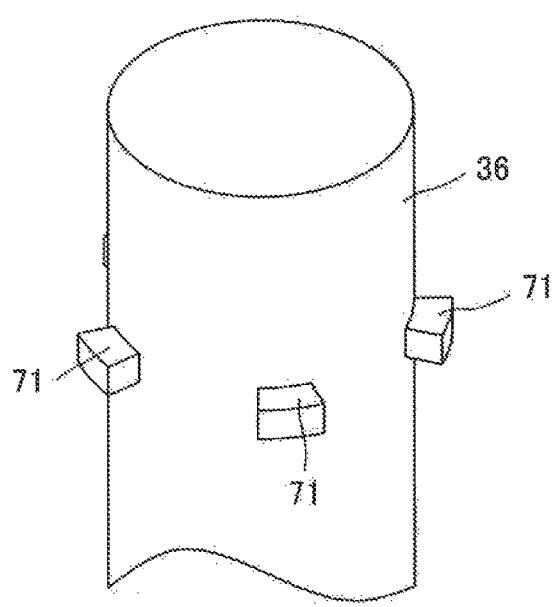
FIG. 23 is a perspective view showing a shaft member of a motor-incorporating roller of still another embodiment of the present invention.

While in the above-described embodiment, the second engagement portion 71 continuous in the circumferential direction has been illustrated in the drawings and the like, the present invention is not limited thereto, as described above. For example, as shown in FIG. 23, the second engagement portion 71 may be intermittently continued.

Figure 24A:
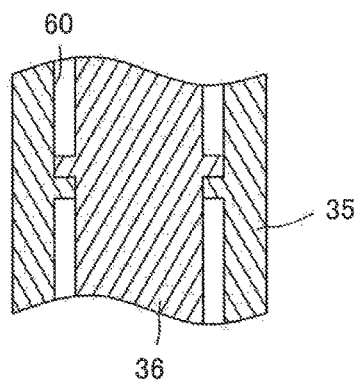
FIGS. 24A to 24D are explanatory views each showing a substantial portion of still another embodiment of the present invention, wherein 24A to 24D are cross-sectional views each showing a substantial portion in the embodiment.
Figure 24B:
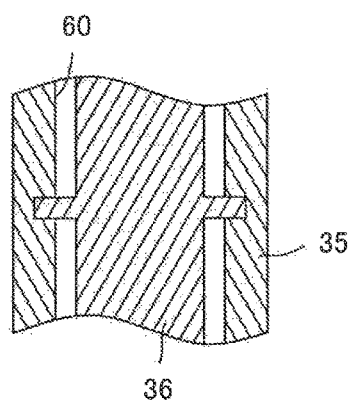
Figure 24C:
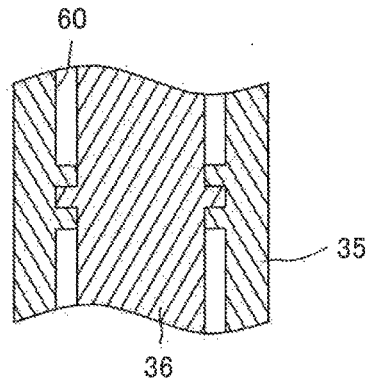
Figure 24D:
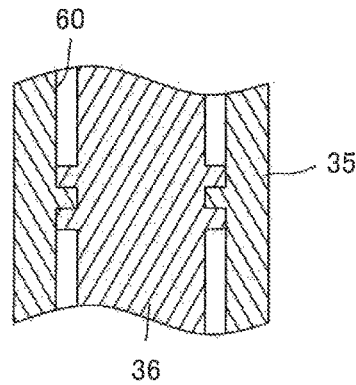

While in the above-described first embodiment, the first engagement portion is a protruding ridge and the second engagement portion is a recessed groove, the present invention is not limited thereto. For example, as shown in FIG. 24A, both the first engagement portion and the second engagement portion may be protruding ridges. Moreover, as shown in FIG. 24B, the first engagement portion may be a recessed groove, and the second engagement portion may be a protruding ridge. As shown in FIG. 24C, the first engagement portion may be two protruding ridges, and the second engagement portion may be a protruding ridge. As shown in FIG. 24D, the first engagement portion may be a protruding ridge, and the second engagement portion may be two protruding ridges.

While in the above-described second embodiment, the flange-like second engagement portion 205 is provided at the end portion of the shaft member 203, the present invention is not limited thereto, but the position of the second engagement portion 205 is not limited to the end portion. That is, a position slightly deviated from the end portion in the axial direction may be employed.

While in the above-described embodiment, the opening shapes of the grease supply holes 52, 55 are each the shape linearly extending from the introduction opening 53, the present invention is not limited thereto, and the opening shapes of the grease supply holes 52, 55 are not particularly limited. For example, they may be circular, polygonal, or elliptical.

While in the above-described embodiment, the cross-sectional shape of the first engagement portion 65 is square, the present invention is not limited thereto. Any shape that enables the first engagement portion 65 to be engaged with the second engagement portion 71 in the axial direction. For example, the cross-sectional shape of the first engagement portion 65 may be polygonal such as triangular and the like, or may be arc-shaped.

While in the above-described embodiment, the grease containing portion is filled with the grease through the introduction opening, the present invention is not limited thereto. For example, an introduction member such as a syringe and the like may be used to introduce the grease from the grease supply holes 52, 55.

While in the above-described embodiment, the shaft member is press-fitted into the fixing hole of the body portion to be fixed, the present invention is not limited thereto. A fixing method other than the press-fitting may be employed. Moreover, the shaft member and the body portion may be molded integrally as one member.

While in the above-described embodiment, the first internal gear for orbit 22 and the second internal gear for orbit 94 are different members, the present invention is not limited thereto. For example, the first internal gear for orbit 22 and the second internal gear for orbit 94 may be integrated.

While in the above-described embodiment, the first internal gear for orbit 22 includes the two regions of the gear formed portion 87 having the gear 86, and the cylindrical surface portion 88 not having the gear 86, the present invention is not limited thereto. For example, the whole in the axial direction may be constructed as the gear formed portion 87 without providing the cylindrical surface portion 88.

While in the above-described embodiment, the reducer 5 includes the planetary gear trains 31, 32 in the two stages, the present invention is not limited thereto. For example, the reducer 5 may be formed of a planetary gear train in one stage, or may be formed of planetary gear trains in three or more stages.

While in the above-described embodiment, the introduction opening 53 is formed of the peripheral wall portions 47 to 50, the present invention is not limited thereto. For example, a wall surface opposed to the bottom wall portion 46 may be provided, and a grease introduction hole penetrating this wall surface may be provided as the introduction opening 53.

Figure 25:
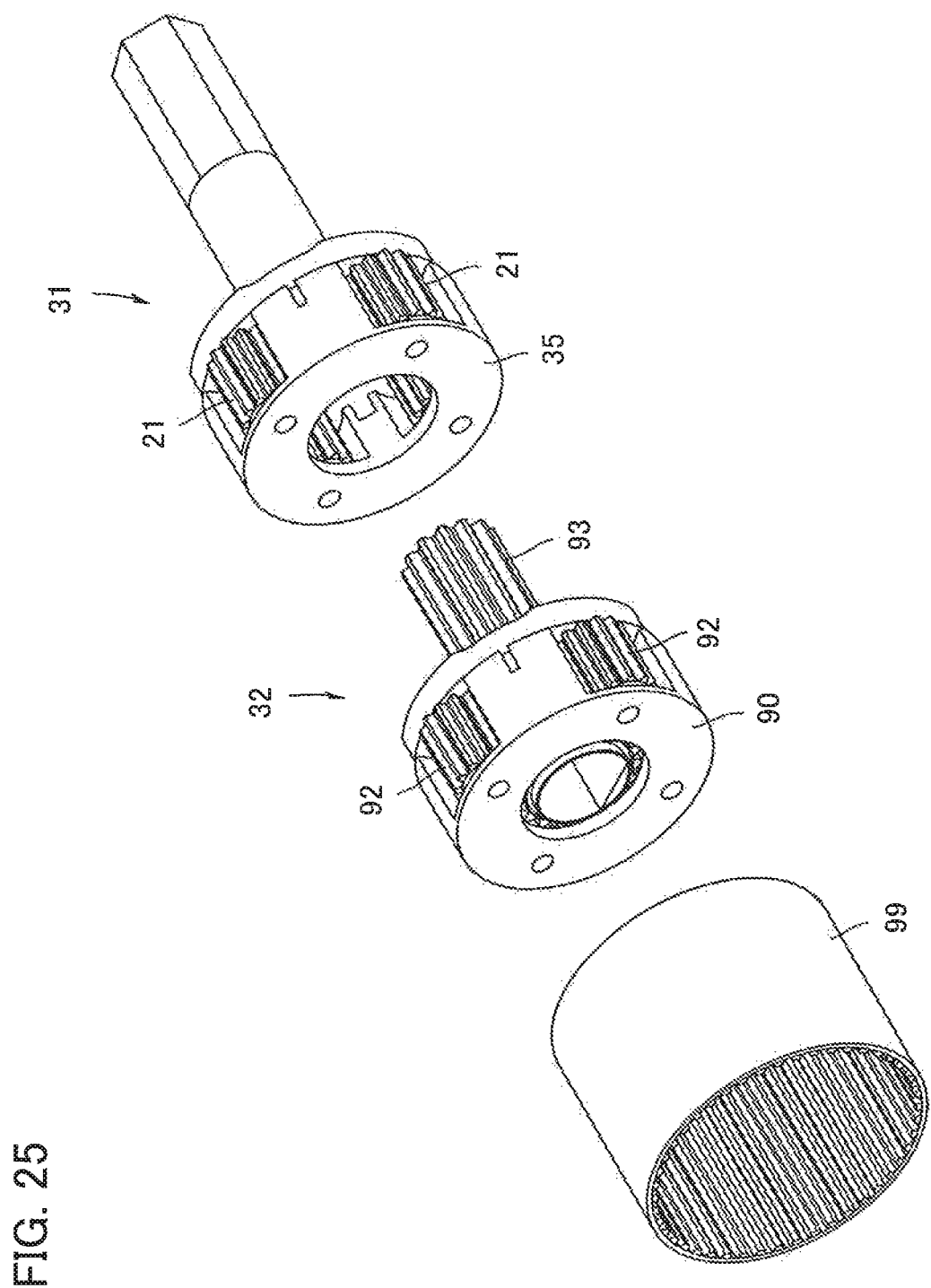
FIG. 25 is an exploded perspective view showing a reducer of another embodiment of the present invention.
Figure 26:
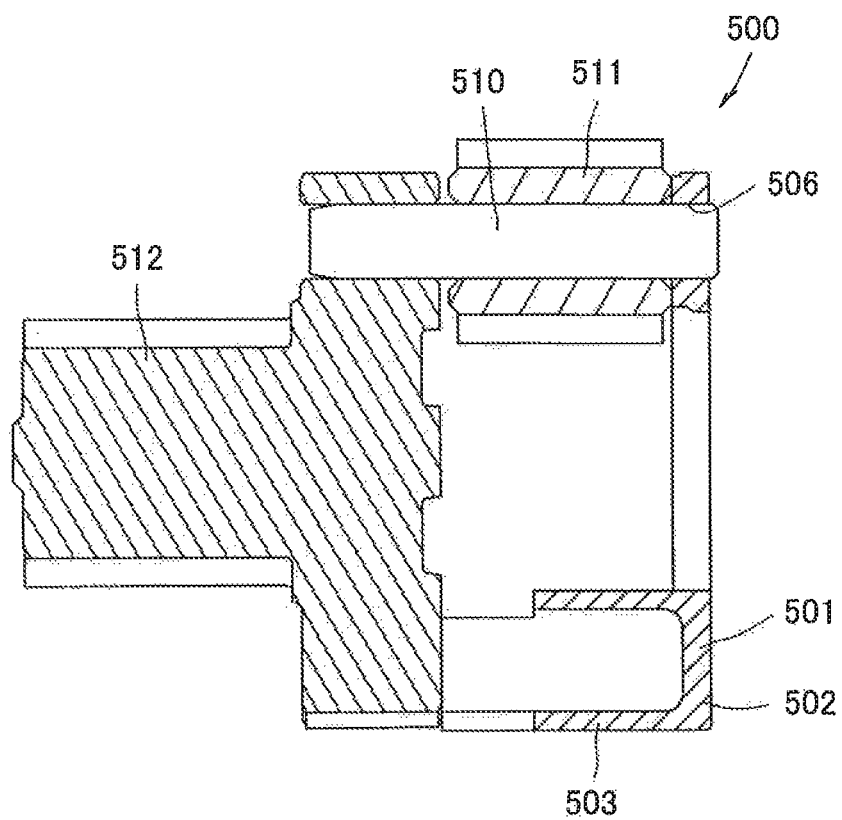
FIG. 26 is a cross-sectional view of a substantial portion of a reducer that the present inventor has produced as trial.

While in the above-described embodiment, the internal gear for orbit is provided for each of the planetary gear trains, the present invention is not limited thereto. For example, as shown in FIG. 25, one internal gear for orbit may be provided for a plurality of planetary gear trains.

EXPLANATION OF REFERENCE SIGNS 1, 200, 300, 400: motor-incorporating roller
2: roller body
3: motor
5: reducer
20: first sun gear (sun gear)
21: first planetary gear (gear)
22: first internal gear for orbit (internal gear for orbit)

35, 201: first grease supply member (grease supply portion)
36, 203: first shaft member (shaft portion)
38: first power output member (power output member)
41: grease containing portion
45: plate-like support portion (first engagement portion)
52, 55: grease supply hole
53: introduction opening (introduction hole)
60, 202: attachment hole
65: first engagement portion (protrusion)
71, 205: second engagement portion
81: interlocking gear portion (sun gear)
90: second grease supply member
91: second shaft member (shaft portion)
92: second planetary gear (gear, planetary gear)
93: second power output member (power output member)
94: second internal gear for orbit (internal gear for orbit)
100: grease
301, 402: locking member (another (other) member)
401: shaft member

The invention claimed is:

1. A motor-incorporating roller comprising a cylindrical roller body that includes a motor and a reducer therein, the reducer including:
a gear train having a plurality of gears; and
a grease supply portion capable of containing grease therein and supplying the grease to the plurality of gears,
the motor-incorporating roller further including:
a power output member outputting power; and
a shaft portion pivotally supporting the gears,
wherein the grease supply portion is integrated with the power output member through the shaft portion to restrict movement of the shaft portion in an axial direction.

2. The motor-incorporating roller according to claim 1, wherein the shaft portion and the grease supply portion are engaged directly or through an alternative member in the axial direction.

3. The motor-incorporating roller according to claim 2,
wherein the grease supply portion has a plate-like support portion,
wherein the plate-like support portion has an attachment hole to which the shaft portion can be attached,
wherein there is a protrusion on at least one of an inner wall surface of the attachment hole and an outer peripheral surface of the shaft portion, and
wherein a part of the shaft portion enters an inside of the attachment hole, so that the inner wall surface of the attachment hole and the outer peripheral surface of the shaft portion are engaged with each other by the protrusion.

4. The motor-incorporating roller according to claim 3, wherein the protrusion is a protruding ridge extending continuously or intermittently in a circumferential direction of the shaft portion.

5. The motor-incorporating roller according to claim 3, wherein the plate-like support portion is formed of resin.

6. The motor-incorporating roller according to claim 2,
wherein the grease supply portion has a plate-like support portion,
wherein the plate-like support portion has an attachment hole to which the shaft portion can be attached,
wherein the shaft portion is inserted into the attachment hole so that an end portion thereof is projected from the attachment hole, and
wherein the alternative member is attached to a projected portion of the shaft portion.

7. The motor-incorporating roller according to claim 1,
wherein the grease supply portion includes a grease containing portion capable of containing the grease therein,
wherein the grease containing portion has an introduction hole capable of introducing the grease from outside, and
wherein when the grease supply portion and the power output member are integrated, a part of the power output member closes an opening of the introduction hole of the grease containing portion.

8. The motor-incorporating roller according to claim 7, wherein an extension direction of the introduction hole is the same as the axial direction of the shaft portion.

9. The motor-incorporating roller according to claim 1,
wherein the grease supply portion has a grease containing portion capable of containing the grease therein,
wherein the grease containing portion includes a grease supply hole capable of delivering the grease, and
wherein while driving, the grease supply portion revolves or rotates inside the roller body to supply the inside grease from the grease supply hole by a centrifugal force or a gravitational force.

10. The motor-incorporating roller according to claim 9,
wherein the grease containing portion includes a pair of the grease supply holes opposed to each other, the pair of the grease supply holes comprising a first grease supply hole and a second grease supply hole,
wherein the first grease supply hole is located nearer a rotation center of the grease supply portion than the second grease supply hole, and
wherein an opening area of the first grease supply hole is larger than an opening area of the second grease supply hole.

11. The motor-incorporating roller according to claim 10,
wherein the grease containing portion has an introduction hole capable of introducing the grease from outside, and
wherein an opening area of the introduction hole is larger than an opening area of each of the grease supply holes.

12. The motor-incorporating roller according to claim 1,
wherein the gear train comprises: a sun gear; a planetary gear; and an internal gear for orbit,
the internal gear for orbit being located outside the sun gear,
the planetary gear being engaged with both the sun gear and the internal gear for orbit to revolve around the sun gear, and
wherein the shaft portion pivotally supports the planetary gear.

* * * * *